(12) United States Patent
Nguyen et al.

(10) Patent No.: US 11,328,026 B2
(45) Date of Patent: May 10, 2022

(54) MULTI-SOURCE DATA ANALYTICS SYSTEM, DATA MANAGER AND RELATED METHODS

(71) Applicant: The Globe and Mail Inc., Toronto (CA)

(72) Inventors: Jennifer Nguyen, Toronto (CA); Michael O'Neill, Toronto (CA)

(73) Assignee: The Globe and Mall Inc., Toronto (CA)

( * ) Notice: Subject to any disclaimer, the term of this patent is extended or adjusted under 35 U.S.C. 154(b) by 342 days.

(21) Appl. No.: 16/007,574

(22) Filed: Jun. 13, 2018

(65) Prior Publication Data

US 2019/0384857 A1   Dec. 19, 2019

(51) Int. Cl.
*G06F 16/00* (2019.01)
*G06F 16/951* (2019.01)
*G06Q 50/00* (2012.01)
*G06N 20/00* (2019.01)

(52) U.S. Cl.
CPC .......... *G06F 16/951* (2019.01); *G06N 20/00* (2019.01); *G06Q 50/01* (2013.01)

(58) Field of Classification Search
CPC ....... G06F 16/951; G06N 20/00; G06Q 50/01
See application file for complete search history.

(56) References Cited

U.S. PATENT DOCUMENTS

| | | | |
|---|---|---|---|
| 8,108,254 B2 | 1/2012 | Lin et al. | |
| 8,543,454 B2 | 9/2013 | Fleischman | |
| 8,554,635 B2 | 10/2013 | England | |
| 8,601,112 B1 * | 12/2013 | Nordstrom | G06Q 10/0633 709/224 |
| 8,645,398 B2 | 2/2014 | Xia | |
| 9,122,989 B1 | 9/2015 | Morris et al. | |
| 9,258,264 B1 * | 2/2016 | Shoham | H04L 51/32 |
| 10,565,267 B1 * | 2/2020 | Teng | G06Q 50/01 |
| 2002/0087679 A1 | 4/2002 | Pulley et al. | |
| 2005/0027619 A1 | 2/2005 | Basak et al. | |
| 2009/0204478 A1 | 8/2009 | Kaib | |

(Continued)

OTHER PUBLICATIONS

Notification of Transmittal of International Search Report and Written Opinion; PCT/CA2019/050712 dated Aug. 20, 2019.

(Continued)

*Primary Examiner* — Diedra McQuitery
(74) *Attorney, Agent, or Firm* — Ridout and Maybee LLP

(57) ABSTRACT

The present disclosure provides a multi-source data analytics system, data manager, and related methods. The multi-source data analytics are measured and used to generate an overall performance indicator. In some examples, the overall performance indicator relates to digital content items available on a digital media platform. The digital media platform obtains relevant data from multiple sources (or channels) and calculates the overall performance indicator so as to account for one or a combination of promotional bias of at least some data sources, user visits (or interactions/views), user engagement, user recirculation, or user acquisition and retention (e.g., subscriber acquisition and retention) for one or more of the multiple data sources. The overall performance indicator may be used by a data manager to locate content on the digital media platform for more effective interaction among other uses.

21 Claims, 21 Drawing Sheets

(56) References Cited

U.S. PATENT DOCUMENTS

| | | |
|---|---|---|
| 2010/0241597 A1 | 9/2010 | Chen et al. |
| 2013/0198376 A1 | 8/2013 | Landa et al. |
| 2014/0025814 A1 | 1/2014 | Muret et al. |
| 2014/0278308 A1 | 9/2014 | Liu et al. |
| 2015/0012545 A1 | 1/2015 | Katz |
| 2015/0149261 A1 | 5/2015 | Walkingshaw et al. |
| 2015/0242515 A1 | 8/2015 | Trabelsi et al. |
| 2015/0304367 A1 | 10/2015 | Chan et al. |
| 2015/0348216 A1 | 12/2015 | Gustafson |
| 2016/0171511 A1 | 6/2016 | Goel et al. |
| 2016/0217489 A1* | 7/2016 | Allard ................ G06Q 30/0246 |
| 2018/0089652 A1 | 3/2018 | Hirandandani |
| 2019/0311149 A1* | 10/2019 | Margel ................ G06F 21/6218 |

OTHER PUBLICATIONS

Extended European Search Report; EP application No. 19820384.6 dated Feb. 22, 2022.
Examination Report; Australian Applicaton No. 2019284230 dated Mar. 1, 2022.

* cited by examiner

MULTI-SOURCE DATA ANALYTICS SYSTEM, DATA MANAGER AND RELATED METHODS

TECHNICAL FIELD

The present disclosure relates to a data services, and in particular to a data manager for a multi-source data analytics system, data manager and related methods.

BACKGROUND

Data services and data analytics are increasingly growing industries. Businesses traditionally focussed on the provision of physical goods and services are increasingly incorporating data services into the planning, design, manufacture, deployment, and evaluation of goods and services sold to customers. In addition, some businesses are transitioning from the provision of physical goods and services to the provision of data services, either in whole or in part. Data driven decision support systems and methods are important for businesses deploying various data services to improve processes and to measure the value generated by the provided data services.

BRIEF DESCRIPTION OF THE DRAWINGS

FIGS. 22 to 23 are example user interface screens of a head-up display provided by the data manager of the present disclosure in accordance with an example embodiment.

DESCRIPTION OF EXAMPLE EMBODIMENTS

Figure 1:
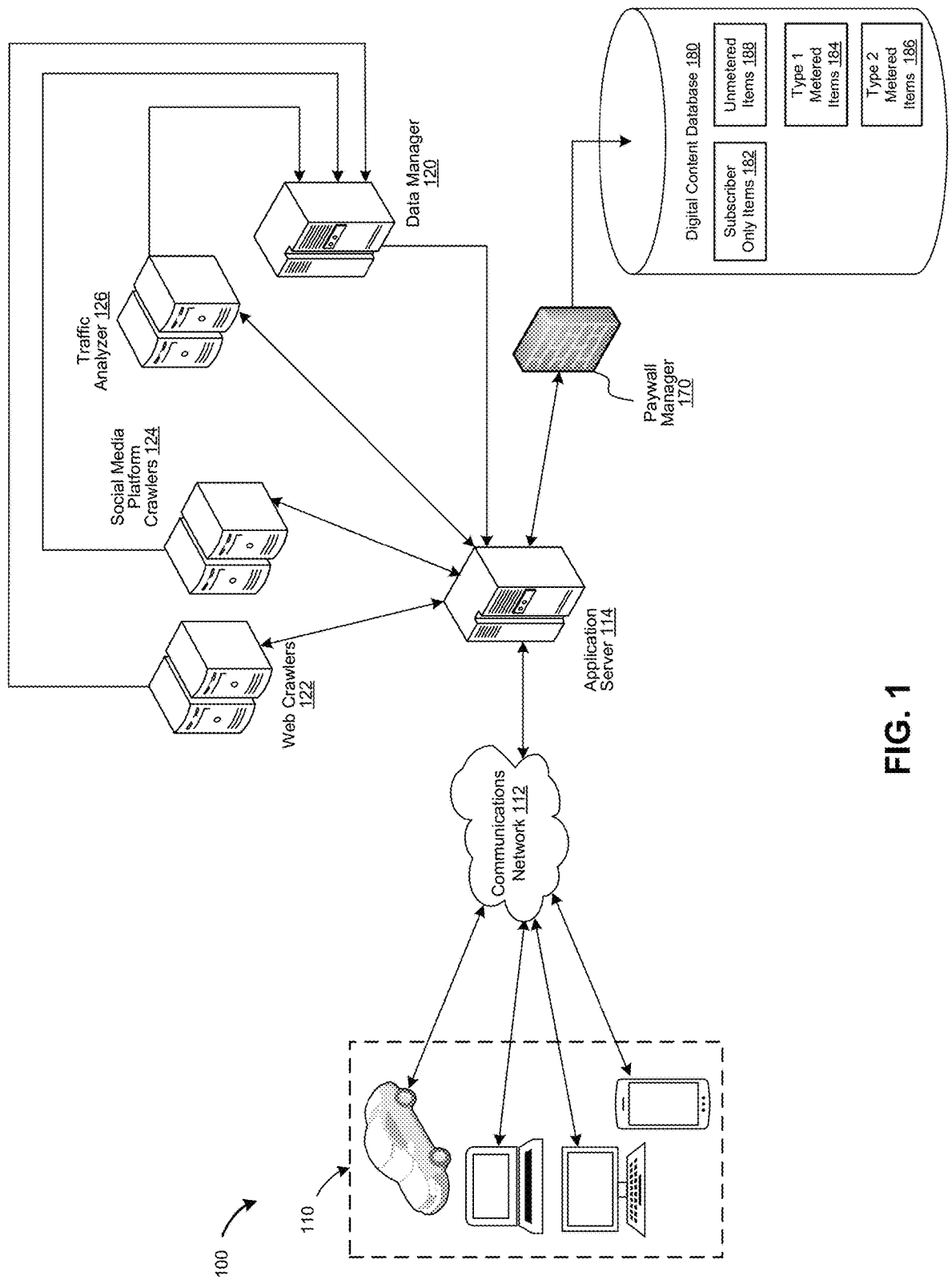
FIG. 1 is a schematic diagram of a multi-source data analytics system in accordance with one example embodiment of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

The present disclosure provides a multi-source data analytics system, data manager, and related methods. The multi-source data analytics are measured and used to generate an overall performance indicator. In some examples, the overall performance indicator relates to digital content items available on a digital media platform. The overall performance indicator of a particular digital content item may vary between industries. For example, the overall performance indicator may represent an enterprise value of digital content item to an owner of the digital media platform, such as a publisher. The digital media platform obtains relevant data from multiple sources (or channels) and calculates the overall performance indicator so as to account for one or a combination of promotional bias of at least some data sources, user visits (or interactions/views), user engagement, user recirculation, or user acquisition and retention (e.g., subscriber acquisition and retention) for one or more of the multiple data sources.

The data manager may use one or more of the performance indicators, such as the overall performance indicator, to manage the digital media platform in one or more ways comprising, but not limited to: dynamically locating digital content items on the digital media platform to increase the promotion of particular digital content items (e.g., determining where to locate new digital content items, determining digital content items already on the digital media platform for which promotion should be changed and new locations where to locate existing digital content items); dynamically determining one or more of a type of widget to be included in a page (e.g., section or content page) to be presented to a client device or one or more digital content items promoted within the widget (e.g., the recommender widget); dynamically classifying digital content items in terms of a type of access the digital media platform (e.g., whether or not behind a paywall, whether digital content items are available to subscribers, non-subscribers, registered users, un-registered users, and/or anonymous users); dynamically generating and presenting an analysis of digital content items on the digital media platform with respect to one or more of the performance indicators (e.g., the overall performance indicator); dynamically identifying topics for new content; or dynamically allocating task assignments based on the identified topics for new content. The management of the digital media platform using one or more of the above-described actions may be performed autonomously or semi-autonomously by a controller, such as machine learning (ML) or artificial intelligence (AI) based controller, which may be programmed or trained by the operator of the digital media platform.

It will be appreciated that the teachings of the present disclosure, in at least some embodiments, operate based upon real-time data (RTD) and provide real-time data in turn. Real-time data is data (or information) that is delivered immediately after collection. There is no delay in the timeliness of the data (or information) provided. The teachings of the present disclosure also generate, in at least some embodiments, dynamic outputs (e.g., analysis and results, etc.) that are generated in real-time. The output is dynamic and real-time in that the output is generated immediately based upon changes in the underlying real-time data received from various multi-source data collection channels.

In accordance with a first aspect of the present disclosure, there is provided a data manager device, comprising: a processor; a memory coupled to the processor, the memory having tangibly stored thereon executable instructions that, when executed by the processor, cause the data manager to: calculate, from crawl data collected by a crawler, an amount of promotion for each digital content item in a plurality of digital content items on a digital media platform during an evaluation period; calculate, from traffic data (such as clickstream data) collected by an internet traffic analyzer collected during the evaluation period for a plurality of traffic types, a number of interactions with each digital content item for each digital content item, an engagement index measuring an amount of time spent by users interacting with each digital content item relative to an average time spent by users interacting with a digital content item, and a recirculation index measuring an amount of interaction with additional digital content items attributable to each digital content item; wherein the traffic types comprise internal traffic directed from the digital media platform, search traffic directed from a search engine, social media traffic directed from a social media network and other traffic, wherein the internal traffic comprises web traffic associated with a website of the digital media platform and/or application traffic associated with client applications of the digital media platform operating on client devices; wherein the number of interactions from internal traffic is adjusted for the calculated amount of promotion of each digital content item; calculate a first performance indicator for each digital content item based on the adjusted number of interactions, engagement index and recirculation index for the digital content item; calculate, from the traffic data collected by the internet traffic analyzer during the evaluation period, an acquisition performance indicator for each digital content item, the acquisition performance indicator measuring an amount of new subscribers during the evaluation period attributable to each digital content item based on a number of interactions for each digital content item from the new subscribers during the evaluation period adjusted for promotion of each digital content item during the evaluation period and a number of new subscribers generated in response to a paywall presented before allowing interaction with the digital content item; calculate, from the traffic data collected by the internet traffic analyzer during the evaluation period, a retention performance indicator for each digital content item based on a retention index measuring an amount of existing subscribers retained during the evaluation period attributable to each digital content item, the retention index based on a number of interactions with the digital content item adjusted for promotion of the digital content item and an average number of interactions for all digital content items in the plurality of the digital content items for promotion of the digital content items; calculate a second performance indicator for each digital content item based on the acquisition performance indicator and the retention performance indicator for the digital content item; calculate an overall performance indicator for each digital content item based on the first performance indicator and the second performance indicator for the digital content item; and output one or a combination of the first performance indicator, second performance indicator or overall performance indicator for each digital content item.

In some embodiments, the first performance indicator, second performance indicator and/or overall performance indicator for each digital content item are output for further processing, the further processing comprise one or a combination of: dynamically locating a set of particular digital content items on the digital media platform to increase promotion of particular digital content items; dynamically determining one or more of a type of widget to be included in a page to be presented to a client device or one or more digital content items promoted within the widget; dynamically classifying digital content items with respect to a type of access type on the digital media platform; dynamically generating and presenting an analysis of digital content items on the digital media platform with respect to one or more of the performance indicators; dynamically identifying topics for new content for the digital media platform; or dynamically allocating task assignments based on identified topics for new content.

In some embodiments, the engagement index is calculated in accordance with the following equation:

$$\text{Engagement Index} = \frac{\text{Time Spent}}{\text{Average Time Spent}}$$

wherein Time Spent represents an average time spent by users interacting the digital content item, Average Time Spent represents an average time spent by users interacting with a digital content item averaged over all digital content items in the plurality of digital content items, wherein a configurable upper and lower limit is applied to the engagement index to avoid extreme values;

wherein the recirculation index is calculated in accordance with the following equation, wherein a configurable upper and lower limit is applied to the recirculation index to avoid extreme values:

$$\text{Recirculation Index} = \frac{\text{Recirculation}}{\text{Average Recirculation}}$$

wherein Recirculation has a value defined as $$\text{Recirculation} = 1 - \frac{\text{bouncers}}{\text{visitors}}$$

wherein bouncers represents a number of users that did not interact with additional digital content items after interacting with the digital content item, and visitors represents a number of individual user interactions with the digital content item.

In some embodiments, the first performance indicator is a user performance indicator denoted User PI that is calculated according to the following equation:

User PI=Internal PI+Search PI+Social PI+Direct PI wherein Internal PI is a performance indicator for internal traffic directed from a page of the digital media platform, Search PI is a performance indicator for search traffic directed from a search engine, Social PI is a performance indicator for social traffic directed from a social network, and Direct PI is a performance indicator for other traffic.

In some embodiments, the Internal PI is calculated according to the following equation:

Internal PI=Adjusted Interactions×Engagement Index×Recirculation Index×Value wherein Adjusted Interactions is the number of interactions from internal traffic adjusted for the calculated amount of promotion of the digital content item and is calculated in accordance with the following equation:

Adjusted Interactions=Total Interactions/Promotion Ratio wherein Total Interactions is a number of interactions with the digital content item during the evaluation period and Promotion Ratio is calculated according to the following equation:

Promotion Ratio=Number of Exposures/Average Number of Exposures wherein Number of Exposures is an estimate of a number of exposures of a promotion for the digital content item calculated during a period of promotion and Average Number of Exposures is an estimate of a number of exposures of an average digital content item promoted on the same page during the same period of promotion, wherein a configurable upper and lower limit is applied to the Number of Exposures to avoid extreme values; and wherein Value is an enterprise value of user interaction.

In some embodiments, the estimation of the number of exposures of the promotion for the digital content item is calculated based on a depth of the promotion for the digital content item with respect to a height of the page on which the digital content item was promoted, a size of the promotion for the digital content item, a number of views of the page on which the digital content item was promoted during the period of promotion, and an average scroll depth during the period of promotion.

In some embodiments, the Search PI, Social PI and Direct PI are calculated according to the following equations:

Search PI=Interactions$_{search}$×Engagement Index$_{search}$×Recirculation Index$_{search}$×Value Social PI=Interactions$_{social}$×Engagement Index$_{social}$×Recirculation Index$_{social}$×Value Direct PI=Interactions$_{direct}$×Engagement Index$_{direct}$×Recirculation Index$_{direct}$×Value wherein Interactions$_{search}$, Interactions$_{social}$ and Interactions$_{direct}$ are the number of interactions for search traffic, social media traffic and other traffic, respectively;

wherein Engagement Index$_{search}$, Engagement Index$_{social}$ and Engagement Index$_{direct}$ are the engagement indexes for search traffic, social media traffic and other traffic, respectively;

wherein Recirculation Index$_{search}$, Recirculation Index$_{social}$ and Recirculation Index$_{direct}$ are the recirculation indexes for search traffic, social media traffic and other traffic, respectively.

In some embodiments, the second performance indicator is a subscriber performance indicator denoted Subscriber PI that is calculated according to the following equation:

Subscriber PI=Acquistion PI+Retention PI wherein Acquistion PI is a measure of the contribution of the digital content item to generating a new subscription, and Retention PI is a measure of the contribution of the digital content item to retaining existing subscription.

In some embodiments, the Acquisition PI is calculated according to the following equation:

Acquisition PI=Adjusted Subscriptions×Subscription Value wherein Adjusted Subscription PI is a measure of the contribution of the digital content item to generating a new subscription, and Subscription Value is an enterprise value of a new subscription;

wherein Adjusted Subscriptions is calculated according to the following

Adjusted Subscriptions=Total Subscriptions/Promotion Ratio wherein Total Subscriptions is a total of a number of full subscription credits and partial subscription credits, wherein a full subscription credit is allotted for a digital content item when a new subscription is generated in response to presenting the new subscriber with a paywall, and a partial subscription credit is allotted for digital content item in the new subscriber's history when a new subscription is not generated in response to presenting the new subscriber with the paywall, wherein the partial subscription credit is calculated according to the following equation:

$$\text{Partial Subscription credit} = \frac{\text{Full Subscription Credit}}{\substack{\text{Number of digital content items} \\ \text{in new subscriber's history} \\ \text{prior to subscription}}}$$

wherein Promotion Ratio is calculated according to the following equation, wherein a configurable upper and lower limit is applied to the Promotion Ratio to avoid extreme values:

Promotion Ratio=Number of Exposures/Average Number of Exposures wherein Number of Exposures is an estimate of a number of exposures of a promotion for the digital content item calculated during a period of promotion, and Average Number of Exposures is an estimate of a number of exposures of an average digital content item promoted on the same page during the same period of promotion.

In some embodiments, the Retention PI is calculated according to the following equation:

$$\text{Retention } PI = \frac{\text{Retention Index} \times \text{Number of Subscribers} \times \text{Subscriber Value}}{\text{Number of Digital Content Items}}$$

wherein Number of Subscribers is a number of subscribers during the evaluation period, Number of Digital Content Items is a number of digital content items available on the digital media platform during the evaluation period, Subscription Value is an enterprise value of an existing subscription, Retention Index is calculated according to the following equation:

$$\text{Retention Index} = \frac{\text{Adjusted Interactions}_{subscribers}}{\text{Average Adjusted Interactions}_{subscribers}}$$

wherein Adjusted Interactions$_{subscribers}$ is an adjusted number of subscriber interactions with the digital content item during the evaluation period adjusted for promotion, and Average Adjusted Interactions$_{subscribers}$ is an average adjusted number of subscriber interactions averaged over all digital content on the digital media platform during the evaluation period adjusted for promotion.

In some embodiments, the first performance indicator is a user performance indicator denoted User PI and the second performance indicator is a subscriber performance indicator denoted Subscriber PI, wherein the overall performance indicator is determined according to the following equation:

$$\text{Overall PI}=\text{User PI}+\text{Subscriber PI}.$$

In some embodiments, the digital media platform comprises a website and an application platform supporting client applications operating on client devices.

In some embodiments, the digital content item comprises one or more of an article, audio, video, streamed audio, streamed video, virtual reality data, or augmented reality data.

In some embodiments, the calculating and outputting are performed in substantially real-time to provide real-time data analytics and/or management of the digital media platform.

In accordance with another aspect of the present disclosure, there is provided a multi-source data analytics system, comprising: an internet traffic analyzer providing traffic data (such as clickstream data) for a digital media platform; a crawler providing crawl logs of the digital media platform; a data manager device in communication with the internet traffic analyzer and the crawler, the data manager device comprising: a processor; a memory coupled to the processor, the memory having tangibly stored thereon executable instructions that, when executed by the processor, cause the data manager to: calculate, from crawl data collected by a crawler, an amount of promotion for each digital content item in a plurality of digital content items on the digital media platform during an evaluation period; calculate, from traffic data collected by an internet traffic analyzer collected during the evaluation period for a plurality of traffic types, a number of interactions with each digital content item for each digital content item, an engagement index measuring an amount of time spent by users interacting with each digital content item relative to an average time spent by users interacting with a digital content item, and a recirculation index measuring an amount of interaction with additional digital content items attributable to each digital content item; wherein the traffic types comprise internal traffic directed from the digital media platform, search traffic directed from a search engine, social media traffic directed from a social media network and other traffic, wherein the internal traffic comprises web traffic associated with a website of the digital media platform and/or application traffic associated with client applications of the digital media platform operating on client devices; wherein the number of interactions from internal traffic is adjusted for the calculated amount of promotion of each digital content item; calculate a first performance indicator for each digital content item based on the adjusted number of interactions, engagement index and recirculation index for the digital content item; calculate, from the traffic data collected by the internet traffic analyzer during the evaluation period, an acquisition performance indicator for each digital content item, the acquisition performance indicator measuring an amount of new subscribers during the evaluation period attributable to each digital content item based on a number of interactions for each digital content item from the new subscribers during the evaluation period adjusted for promotion of each digital content item during the evaluation period and a number of new subscribers generated in response to a paywall presented before allowing interaction with the digital content item; calculate, from the traffic data collected by the internet traffic analyzer during the evaluation period, a retention performance indicator for each digital content item based on a retention index measuring an amount of existing subscribers retained during the evaluation period attributable to each digital content item, the retention index based on a number of interactions with the digital content item adjusted for promotion of the digital content item and an average number of interactions for all digital content items in the plurality of the digital content items for promotion of the digital content items; calculate a second performance indicator for each digital content item based on the acquisition performance indicator and the retention performance indicator for the digital content item; calculate an overall performance indicator for each digital content item based on the first performance indicator and the second performance indicator for the digital content item; and output one or a combination of the first performance indicator, second performance indicator or overall performance indicator for each digital content item.

In accordance with a further aspect of the present disclosure, there is provided a multi-source analytical method performed by a data manager, the method comprising: calculating, from crawl data collected by a crawler, an amount of promotion for each digital content item in a plurality of digital content items on a digital media platform during an evaluation period; calculating, from traffic data (such as clickstream data) collected by an internet traffic analyzer collected during the evaluation period for a plurality of traffic types, a number of interactions with each digital content item for each digital content item, an engagement index measuring an amount of time spent by users interacting with each digital content item relative to an average time spent by users interacting with a digital content item, and a recirculation index measuring an amount of interaction with additional digital content items attributable to each digital content item; wherein the traffic types comprise internal traffic directed from the digital media platform, search traffic directed from a search engine, social media traffic directed from a social media network and other traffic, wherein the internal traffic comprises web traffic associated with a website of the digital media platform and/or application traffic associated with client applications of the digital media platform operating on client devices; wherein the number of interactions from internal traffic is adjusted for the calculated amount of promotion of each digital content item; calculating a first performance indicator for each digital content item based on the adjusted number of interactions, engagement index and recirculation index for the digital content item; calculating, from the traffic data collected by the internet traffic analyzer during the evaluation period, an acquisition performance indicator for each digital content item, the acquisition performance indicator measuring an amount of new subscribers during the evaluation period attributable to each digital content item based on a number of interactions for each digital content item from the new subscribers during the evaluation period adjusted for promotion of each digital content item during the evaluation period and a number of new subscribers generated in response to a paywall presented before allowing interaction with the digital content item; calculating, from the traffic data collected by the internet traffic analyzer during the evaluation period, a retention performance indicator for each digital content item based on a retention index measuring an amount of existing subscribers retained during the evaluation period attributable to each digital content item, the retention index based on a number of interactions with the digital content item adjusted for promotion of the digital content item and an average number of interactions for all digital content items in the plurality of the digital content items for promotion of the digital content items; calculating a second performance indicator for each digital content item based on the acquisition performance indicator and the retention performance indicator for the digital content item; calculating an overall performance indicator for each digital content item based on the first performance indicator and the second performance indicator for the digital content item; and outputting one or a combination of the first performance indicator, second performance indicator or overall performance indicator for each digital content item.

In accordance with yet a further aspect of the present disclosure, there is provided a non-transitory machine readable medium having tangibly stored thereon executable instructions for execution by a processor of a device, such as a data manager. The executable instructions, when executed by the processor, cause the data manager to perform the methods described above and herein.

Figure 2:
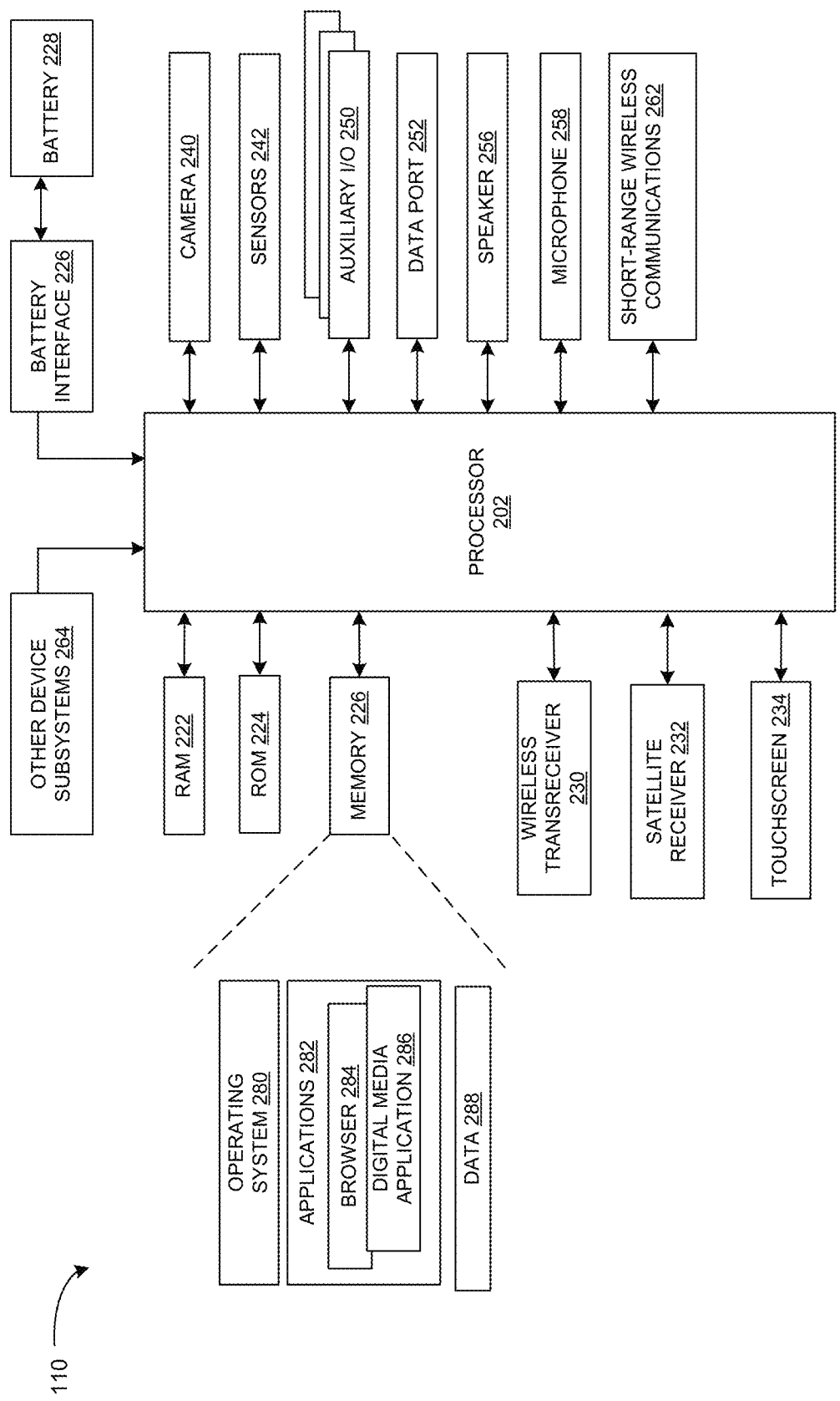
FIG. 2 is a block diagram of a client device suitable for use in the multi-source data analytics system of the present disclosure.

Reference is first made to FIG. 1 which shows in schematic block diagram form a multi-source data analytics system 100 in accordance with one example embodiment of the present disclosure. The multi-source data analytics system 100 comprises a plurality of client devices 110 that communicate with an application server 114 via a communication network 112 such as the internet via an internet browser 284 (FIG. 2). The application server 114 is a digital media content server that provides a digital media platform for delivering digital media content to the client devices 110. In addition to delivering digital media content, the application server 114 may allow for user feedback, discussion and/or sharing.

The digital media platform may be an audio streaming service, video streaming service, virtual reality service, augmented reality service, digital publisher such as a journal, or digital newspaper, or a combination of such services or similar services. Although example embodiments are described below in which the digital media platform is a digital newspaper operated by a news publisher, the teachings of the present disclosure are not intended to be limited to digital newspapers or the like. The teaching of the present disclosure can be applied, with suitable accommodations, for accessing any type of digital content.

The application server 114 provides access to a plurality of digital content items stored in a database 180. The content items may be text documents (such as newspaper articles, scholarly, articles, journal articles, books, or the like), audio files (such as songs, ringtones, or the like), video files (such as movies, television programs, podcasts or the like), or a combination thereof.

Access to digital content items in the database 180 is managed by a paywall enforced by a paywall manager 170. As described below, the paywall employed by the multi-source data analytics system 100 is a hybrid paywall (or combination paywall) in which users are allowed free access to selected content being protected by a soft paywall (also known as a metered paywall) with a set of premium content being protected by a hard paywall. Digital content items in the database 180 are classified by an access type. The access type of the content items is defined based on a type of user that can access the digital content item. In some embodiments, the types of users consist of subscribers and non-subscribers. The types of users consist of: subscribers, non-subscribers, registered users, un-registered users, and anonymous users. The term "subscriber" refers to a registered user having a full subscription. The term "registered user" refers to a user who has registered a registered account with the operator of the digital media platform. A registered user may or may not be a subscriber. An anonymous user is a user having an unknown status because the identity of the user is unknown (for example, the user is not logged in to the digital media platform). An anonymous user may be a subscriber or non-subscriber, a registered user or an un-registered user.

The digital content items in the database 180 are classified by three or more different types in the described embodiment: subscriber only items 182, free items (or all user items) 184, and metered items. Greater or fewer types of metered items may be provided in other embodiments. Subscribers have full, unrestricted access to the database 180. Non-subscribers have restricted access to the database 180, the nature of the restrictions varying based on depending on the particular digital content item and particular user type.

Access to subscriber only items 182 is restricted to subscribers. Free items 184 are available to all users in an unlimited amount. Any user, registered or unregistered, may access an unlimited number of digital content items classified as "free". Metered items allows non-subscribers to access a specific number of digital content items before being prompted to subscribe for full access (referred to as the quota), with the quote being reset or refreshed at regular intervals (e.g., monthly or every 30 days). Two types of metered items are provided in the described embodiment: type 1 metered items 186 and type 2 metered items 188. Non-subscribers can only access the predetermined number of type 1 metered items 186 whereas non-subscribers can access an unlimited number of type 2 metered items 188. However, the user will be prompted to subscribe for full access (referred to as the quota) when attempting to access type 2 metered items 188 after the quota is reached in a period, and the user must be registered and login to the digital media platform to access any type 2 metered items 188 after the quota is reached in a period. Metered items allows non-subscribers to access a specific number of digital content items before being prompted to subscribe for full access (referred to as the quota), with the quote being reset or refreshed at regular intervals (e.g., monthly or every 30 days).

The classification of each digital content item in the database 180 is stored in a database schema based on a respective content ID. The database schema correlates the content ID of each digital content item to its corresponding class. The classification of digital content items may be changed by a database manager by updating the database schema without affecting a change in the underlying digital content items.

The user type, user ID (if known) and the number of digital content items accessed during the current interval is typically tracked by cookies stored by the internet browser 284 on the client device 110. The paywall manager 170 uses the user type, the number of accessed items, content ID, and user ID information stored by the cookies stored by the internet browser 284 on the client device 110 to determine whether access to a particular digital content item is allowed in response to a request to access the particular digital content item. When access to the particular digital content item is allowed, access to the particular digital content item is provided. Accessing may comprise, for example, displaying a web page or other document, streaming an audio or video file, or downloading a web page or other document, audio file or video file.

When access to the particular digital content item is not allowed, a paywall user interface screen of the paywall manager 170 is displayed on the client device 110 via the internet browser 284. The paywall user interface screen allows, via corresponding links, boxes or other user interface elements, subscribers and other registered users to login to the digital media platform, allows registered users who are not subscribers to subscribe, and allows non-registered users to register with the digital media platform and optionally subscribe, and login, as the case may be. When the request digital content item is a subscriber only item 182, access will only be granted if the user is a subscriber.

Metered paywalls such as that provided by the present disclosure allow users to access a specific number of digital content items before being prompted to subscribe for full access. Metered paywalls strike a good balance between adding additional revenue without overtly alienating the entire userbase. Metered paywalls typically have higher traffic and higher user retention compared with hard paywalls in which all content is restricted to subscribers.

The digital media ecosystem is very complex and varied. Accordingly, the nature of the paywall (i.e., whether hard, or a combination thereof), the number of classes, and the segmentation of digital content items into each class depends on a variety of factors comprising the uniqueness of content, market share of the operator, and user demographics. Indeed, one potential use of the multi-source data analytics system 100 of present disclosure is in the classification of digital media content.

The application server 114 is also connected to a data manager 120 via a communication network (not shown), such as the communication network 112. In other embodiments, the application server 114 and data manager 120 may be combined.

The communication network 112 may comprise a plurality of networks of one or more network types coupled via appropriate methods known in the art comprising but not limited to, a local area network (LAN), a wireless local area network (WLAN) such as Wi-Fi™, a wireless personal area network (WPAN) such as Bluetooth™ based WPAN, a wide area network (WAN), a public-switched telephone network (PSTN), or a public-land mobile network (PLMN) also referred to as a wireless wide area network (WWAN) or a cellular radio access network.

The client devices 110 are equipped for one or both of wired and wireless communication. The client devices 110 may be any computing device equipped for communicating over LAN, WLAN, Bluetooth, WAN, PSTN, PLMN, or any combination thereof. For example, the client devices 110 may be fixed (or desktop) personal computers or mobile wireless communication devices. The client devices 110 may communicate securely with the data manager 120 using, for example, Transport Layer Security (TLS) or its predecessor Secure Sockets Layer (SSL).

Examples of the mobile wireless communication devices comprise, but are not limited to, handheld wireless communication devices, such as smartphones, tablets, laptop or notebook computers, netbook or ultrabook computers, vehicles having an embedded-wireless data management system, such as a Wi-Fi™ or cellular equipped in-dash infotainment system, or tethered to another wireless communication device having such capabilities. The mobile wireless communication devices may comprise devices equipped for cellular communication through PLMN or PSTN, mobile devices equipped for Wi-Fi™ communication over WLAN or WAN, or dual-mode devices capable of both cellular and Wi-Fi™ communication. It will be appreciated that the mobile wireless communication devices may roam within and across PLMNs. In some instances, the mobile wireless communication devices are configured to facilitate roaming between PLMNs and WLANs or WANs, and are thus capable of seamlessly transferring sessions from a coupling with a cellular interface to a WLAN or WAN interface, and vice versa.

The data manager 120 typically comprises one or more servers. The data manager 120 may be a single computing device (or system) comprising a plurality of function components (or modules). Alternatively, the data manager 120 may comprise multiple functional components distributed among a plurality of computing devices (or systems). The functional components may be in the form of machine executable instructions embodied in a machine readable medium. The teachings of the present disclosure are flexible and capable of being operated in various different environments without compromising any major functionality.

The multi-source data analytics system 100 also comprises a plurality of data providers (also known as data sources) comprising web crawlers 122, social media platform crawlers 124, and a traffic analyzer 126. The data providers are data services provided by corresponding servers or the like. The application server 114, data provider 120 and data providers may each be operated by different operating entities. Alternatively, the data providers may be operated by the same entity as the application server 114 or data provider 120, or may be operated by independent entities. Similarly, the application server 114 and data provider 120 may be operated by the same entity or different entities.

The data manager 120 communicates with the data providers via a communication network (not shown), such as the communication network 112. In other embodiments, the data provider 120 may be part of the application server 114, for example, in the form of application modules of the application server 114. Similarly, one or more of the data providers and the application server 114 and/or any one or more of the data providers.

The web crawlers 122 collect website promotion data from a designated website, which may be associated with the digital media platform. The website comprises a plurality of web pages, which comprise a plurality of content pages. Each content page comprises a digital content item. The digital content item may comprise text, audio, images, videos or a combination thereof. The digital content item may be articles (e.g., digital newspaper articles, scholarly articles, or the like), recipes, blogs, videos, image galleries, or financial analysis or reports. The web crawlers 122 (also known as web spiders or web robots) comprise automated programs or scripts that browse the designated website in a methodical, automated manner at regular intervals, for example every two minutes. The web crawlers 122 may be implemented using a headless browser such as PhantomJS™ in some embodiments. The web crawlers 122 create a copy (e.g., "snapshot") of web pages on the website by storing a copy of web pages, extracting data from the copied web pages, storing the extracted data, and analyze the extracted data. The website promotion data may be stored in a website promotion database 410 (FIG. 4), which may be part of the data manager 120.

Figure 6:
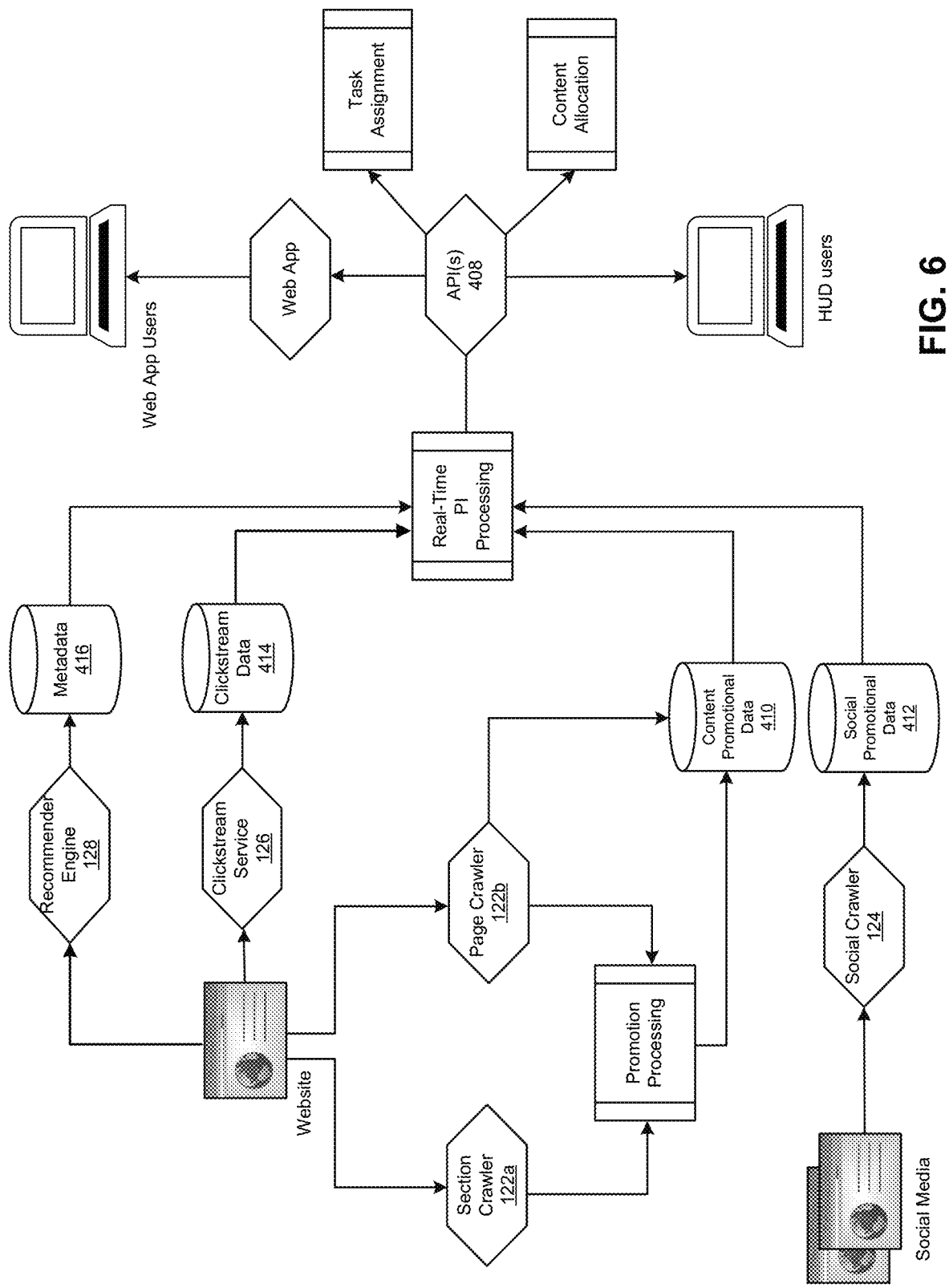
FIG. 6 is a dataflow diagram illustrating a method of digital content management in accordance with one example embodiment of the present disclosure.

A different web crawler 122 may be used for different page types when more than one page type exists. A page type is differentiated by the structure or layout of the page. In examples in which the digital media platform is a digital newspaper, the designated website may comprise section pages and content pages and two types of web crawlers are used: a section page crawler 122a (FIG. 6) and a content page crawler 122b (FIG. 6). The web crawlers 122 may crawl web pages at different intervals to reflect that different types of pages may be subject to change at different rates. For example, the section page crawler 122a may crawl section pages at a shorter interval than the content page crawler 122b crawls content pages. In one example, the section page crawler 122a crawl section pages every 2 minutes while the content page crawler 122b crawls content pages every 5 minutes. In other examples, a single type of web crawler 112 may crawl section pages and content pages.

The web crawlers 122 crawls the pages for promotions for digital content items. In the described embodiment, each page contains a plurality of digital containers in the form of web widgets (hereinafter "widgets" for convenience). A promotion is a reference to a digital content item contained in a page of another content item or a section page, or a widget contained in the respective content page or section page. Each widget is a user interface element that comprises one or more promotions for a digital content item (e.g., content page). The number and particular widgets on each page may vary, along with the size of each widget. The number and particular widgets on each page may be determined by the data manager 120 based on one or more of the performance indicators, such as the overall performance indicator.

Each promotion comprises text and optionally other content such as an image (e.g., photo) or possibly audio, video or a combination thereof. The text of promotions may be a name, title, headline or the like associated with the digital content item (e.g., article). The text of promotions in the widget may be the same as name, title or headline of the digital content item or different, depending on the particular page and the particular widget. In some examples, the text may comprise a name, title, headline or the like as well as a preview of the content of the digital content item, a source (e.g., author, news agency or the like), date, time reference (e.g., time since posting), or status identifier (e.g., new, updated, etc.). An Hypertext Markup Language (HTML) tag around each promoted digital content item within a widget is marked with meta-tags to specify the content ID of the item, the name of the widget, the position (or order) of the item within the web widget, the name of the page on which the widget was located, and the position of the widget on the page.

Each widget also comprises an embedded link to each of the content pages referred by the one or more promotions in the respective widget. In some examples, such as when the widget comprises a single promotion to a content page, selecting anywhere in the widget causes the respective content page to be displayed in the internet browser 284 of the client device 110. In other examples, such as when the widget comprises a number of promotions to a number of different content pages, the embedded link may be embedded in the text of the promotion or other content (e.g., image) so that selection of the text or other content which is encoded with the embedded link is required to cause the respective content page to be displayed in the internet browser 284 of the client device 110.

Figure 7:
FIG. 7 is a portion of an example section page of a digital newspaper with which example embodiments of the present disclosure may be used.

Section pages each comprise a plurality of different widgets, each widget comprising one or more promotions. Section pages not comprise any digital content items, although a preview may be provided in one of the promotions on the section page. FIG. 7 illustrates a portion of an example section page of a digital newspaper with which example embodiments of the present disclosure may be used. In particular, FIG. 7 illustrates a top level section page or home page. The page comprises a section bar 701 listing a number of tabs, each tab corresponding to a section of the digital newspaper as well as a drop down menu. The tabs and dropdown menu allow for the selection of a particular section of the digital newspaper. The page also comprises a number of widgets 702, 704, 706, 708, 710, 712, 714, and 716. Greater or fewer widgets may be provided in other examples of a content page. Only a portion of the page is shown in FIG. 7. Additional content below the shown content is accessed by scrolling input using an input device of the client device 110, which may vary depending on the client device 110. Additional widgets may be present in the additional off-screen content of the page. The widgets 702, 710 and 714 contain a single promotion whereas the remaining widgets contain multiple promotions. In the shown example, some of the widgets comprise a title or topic, which may or may not correspond to the name of a section of the digital newspaper. It will also be appreciated that a given digital content item (e.g., article) may be published in more than one section of the digital newspaper.

The section crawler 122a crawls each section page, comprising top level and subsection pages, for promotions for digital content items contained in the widgets of the respect section pages. Top level section pages are parent sections (e.g., Investing) and subsection pages are the children of these parent sections (e.g., Advisor, Wealth, etc.). Functionally, a top level section page has a sample of items from all subsection pages, whereas subsection pages only have promotions to items for that category. The section crawler 122a analyzes section pages to identify promotions for a digital content items in the section pages, and for each promotion identified, determines the section page in which the promotion was located, the name of the widget in which the promotion was located, a size of the promotion, and a location of the promotion with respect to the height of the section page in which the promotion was located. The size of the promotion may be based on the width, height or a combination thereof of the entire promotion or merely the text comprised in the promotion, such as a title or article headline.

Figure 8:
FIG. 8 is a portion of an example content page of a digital newspaper with which example embodiments of the present disclosure may be used.

Content pages each comprise a content item and a plurality of different widgets, each widget containing one or more promotions. FIG. 8 illustrates a portion of an example content page of a digital newspaper with which example embodiments of the present disclosure may be used. The page of FIG. 8 comprises a content item in the form of a digital newspaper article 801, a "Trending" widget 802, a "Latest Videos" widget 804, and a "Next Story" widget 806. Greater or fewer widgets may be provided in other examples of a content page. For example, a "More Stories" widget may be provided in other examples. The content page crawler 122b analyzes content pages to identify promotions for a digital content items in the content pages, and for each promotion identified, determines the content page in which the promotion was located (e.g., by content ID), the name of the widget in which the promotion was located if any or if the promotions was located in the body of the content page, a size of the promotion, and a location of the promotion with respect to the height of the content page in which the promotion was located.

The results of the web crawling operations are stored in a promotion database 410 (FIG. 4), which is updated in real-time. The stored results are known as crawl logs and comprise a copy of the crawled pages. The crawl logs comprise a content ID of the respective digital content item that was promote, the names of the one or more widgets in which the digital content item was promoted (if any), the names of the pages in which the widgets were located, the name of one or more content pages which the digital content item was promoted (if any), location of the promotion with respect to the height of the page in which the promotion was located, and a timestamp at which the crawl log was made which provides a time reference. The promotion database 410 may be a Dynanmo database such as an Amazon DynamoDB™ hosted service within the Amazon Web Services (AWS) infrastructure in at least some embodiments. The Dynanmo database provides a highly available key-value structured storage system.

The web crawlers 122 may use a subset of one or more of the possible screen size and resolutions when crawling and determining the location of a promotion with respect to the height of the page in which the promotion was located. The subset may be a set screen size and resolution in some embodiments for ease of implementation for some loss in accuracy. Alternatively, the web crawlers 122 may crawl two views of the website in other embodiments, a desktop view and a mobile view each with a different screen size and resolution, to provide increased accuracy. To provide even greater accuracy, in yet other embodiments the web crawlers 122 may crawl a number of different views of the website, for example, all or substantially all possible screen sizes and resolutions.

The data manager 120 performs an aggregation process at regular intervals to analyse crawl logs to calculate a length of time each digital content item has been promoted for each promotion location at which a respective digital content item is promoted. The aggregations process may be performed at the same interval as that the web crawling is performed.

The social media platform crawlers 124 collect social media promotion data at regular intervals from social media pages of a plurality of social media platforms such as Facebook™, Twitter™, Instagram™ and the like. In some examples, social media crawlers 124 collect social media promotion data every two minutes. The social media platform crawlers 124 create a copy (e.g., "snapshot") of covered social media pages by storing a copy of the social media pages, extracting data from the copied pages, storing the extracted data, and analyzing the extracted data.

The social media promotion data may be stored in a social media promotion database 412 (FIG. 4), which may be part of the data manager 120. The covered social media pages crawled by the social media platform crawlers 124 may be designated social media pages maintained by the operator of the digital media platform. Designated social media pages maintained by the operator typically comprises promotions for a subset of the digital content items appearing on the digital media platform. Alternatively, the covered social media pages may be personal pages of users of social media platforms that have consented to sharing content information. Alternatively, the covered social media pages may be a combination of social media pages maintained by the operator and personal pages.

The extracted social media promotion data comprises a time of a post promoting a digital content item, the content of the post, and a count of the number of "likes", "shares" and "comments" it has received on each social media platform, if any. In some embodiments, the social media promotion database 412 is a NoSQL database or other database type which is able to store data in a rich and flexible way, i.e., values and schemas are easily updated.

The collection interval of the web crawlers 122 and social media platform crawlers 124 are preferably the same, and preferably coordinated to occur at the same time to increase the utility of downstream data analytics.

The traffic analyzer 126 collects and analyzes traffic data, such as clickstream data, from the designated website. The clickstream data measures user activity on the website comprising content IDs, user ID (used to count a number of visits, if any), user type (anonymous, registered, subscriber), traffic referrer type (e.g., social media, search, direct), a referrer ID (name and/or URL), a session ID (used to de-duplicate views of the same content item), scroll depth, paywall encounters, subscription events in which an anonymous or registered user changes to a subscriber (also known as conversion) and optionally content links on the page that entered the viewport. The traffic analyzer 126 may be proprietary or a third party such as Google Analytics™, Snowplow Analytics™, Adobe Omniture™ or a combination thereof.

Clickstream analysis (analytics) provides data about every page a website visitor visits and in what order the pages are visited. The path a visitor takes through the website is known as the clickstream. Clickstream data is sent to the data manager 120, typically by a web service called in response to a script in a web page of the website viewed by a client device 110. The clickstream data is typically collected in real-time.

The clickstream data collection may be initiated by the HTML code of the requested webpage. The clickstream data collection may be initiated by a script triggered by a <img> tag located in the HTML. The <img> tag triggers a request for a small picture, typically a size of 1×1 pixels. This picture is commonly referred to as a "tracking pixel". The source of the tracking pixel is the endpoint of the web service capturing the clickstream data. When the internet browser 284 on the client device 110 sends a request for an HTML file to the application server 114, the application server 114 then sends the HTML file to the internet browser 284 to be read. The internet browser 284 then renders the web page.

When the internet browser 284 encounters the <img> tag when rendering the web page, it sends a request for that image to the application server 114, the application server sends the image to the browser 284 to be rendered, and the browser 284 continues to render the page. The browser 284 then encounters a <script> tag in the HTML file that requests the tracking pixel. The browser 284 of the client device 110 then sends the pixel request as well as a data payload to the application server 114 within the pixel request.

The data payload sent with the server call for the tracking pixel is stored in a clickstream database 414 (FIG. 4) of the data manager 120 after enrichment and processing, described below. The data payload sent with the pixel request comprises browsing data to a database. The application server 114 then returns the tracking pixel, typically a transparent image, which is rendered in the viewed page but not perceptible to the user.

The data payload sent with the pixel request may comprise one or both of static and dynamic browsing data. Static browsing data is data that is equal for all user visits/page views, for example at what time the server call was made. Dynamic browsing data is data that is unique for each visitor, for example which the internet browser 284 the visitor is using, an IP address, etc. This data collection process is performed by the internet browser 284 on the client device 110 which then sends the data payload to the data manager 120 for storing in the clickstream database after enrichment and processing, described below.

The script that makes the tracking pixel server calls are typically programmed using JavaScript, enabling tracking pixel server calls to be made after the web page has loaded completely and rendered all other contents on the page. Because the JavaScript making the pixel request is executed after the page has loaded successfully, the clickstream data collection does not interfere with user's web browsing. JavaScript also enables server calls to be made without the page being rendered. JavaScript triggered server calls are also useful when the clickstream data being collected comprises online behavior that is not related to a page load, for example if the visitor clicks or starts watching a video on the webpage.

The traffic analyzer 126 performs enrichment and processing on the clickstream data collected by the clickstream web service, i.e., the data payloads, using web analytical data. Enrichment augments the clickstream data collected by the clickstream web service with additional information. Each web event is typically assigned a unique event identifier (UUID). For each event, at least the following information is returned: a user ID, a user agent ID (i.e., browser ID), a user IP address, a time stamp identity the event start, an event duration, a screen/monitor resolution in terms of pixel width and pixel height (e.g., 1280×1024), a screen/monitor size in terms of pixel width and pixel height (e.g., viewport size), a device type, and an indication whether the device is mobile. Referrer enrichment may be used to determine referrer URLs. Campaign attribution enrichment may be used to determine an entity to which the event may be attributed. In the context of an operator of the digital media platform, this may be a business unit such as marketing or sales, etc.

In some embodiments, the digital media platform may comprise the website as well as an application platform supporting client applications operating on client devices, which may be in different device ecosystems. For example, the application platform may comprise an application server (not shown) supporting one or more client applications on smartphones, tablets, laptop computers or other internet-connected computing devices, such as Android™, iOS™ or Windows™ based applications on mobile or fixed internet-connected computing devices. In such embodiments, one or more application crawlers for crawling pages of the client applications are used by the digital media platform. The application crawlers operate similar to a web crawler and social media crawler (which may be specialized-type of web crawler) but on client applications for various device ecosystems. In addition, in such embodiments the internal traffic of the digital media platform comprises web traffic associated with a website of the digital media platform and/or application traffic associated with the client applications of the digital media platform operating on client devices of the various device ecosystems.

Data Manager

Figure 3:
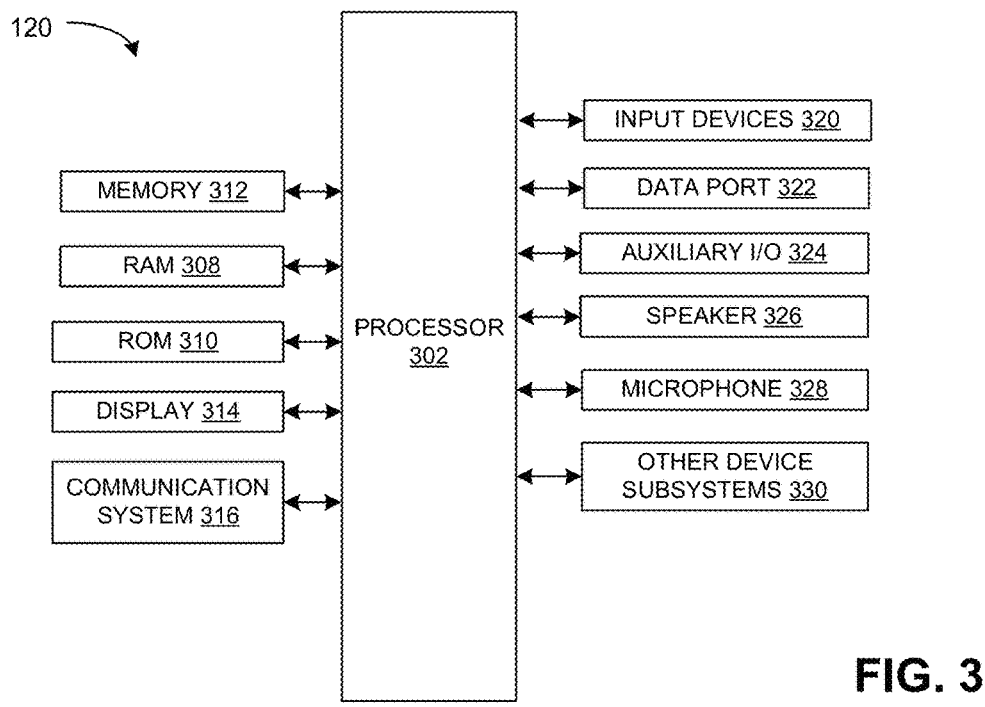
FIG. 3 is a block diagram of a data manager in accordance with one example embodiment of the present disclosure.

Reference is next made to FIG. 3 which illustrates in simplified block diagram form a data manager 120 in accordance with one example embodiment of the present disclosure. The data manager 120 comprises a controller comprising at least one processor 302 (such as a microprocessor) which controls the overall operation of the data manager 120. The processor 302 is coupled to a plurality of components via a communication bus (not shown) which provides a communication path between the components and the processor 302.

The data manager 120 comprises RAM 308, ROM 310, a persistent memory 312 which may be flash memory or other suitable form of memory, a communication subsystem 316 for wired and/or wireless communication, one or more input device(s) 320, a data port 322 such as a serial data port, auxiliary input/outputs (I/O) 324, and other devices subsystems 330. The input device(s) 320 may comprise a keyboard or keypad, one or more buttons, one or more switches, a touchpad, a rocker switch, a thumbwheel, or other type of input device.

Operating system software executed by the processor 302 is stored in the persistent memory 312 but may be stored in other types of memory devices, such as ROM 310 or similar storage element. The persistent memory 312 comprises installed applications and user data, such as saved files, among other data. The processor 302, in addition to its operating system functions, enables execution of software applications on the data manager 120.

Figure 4:
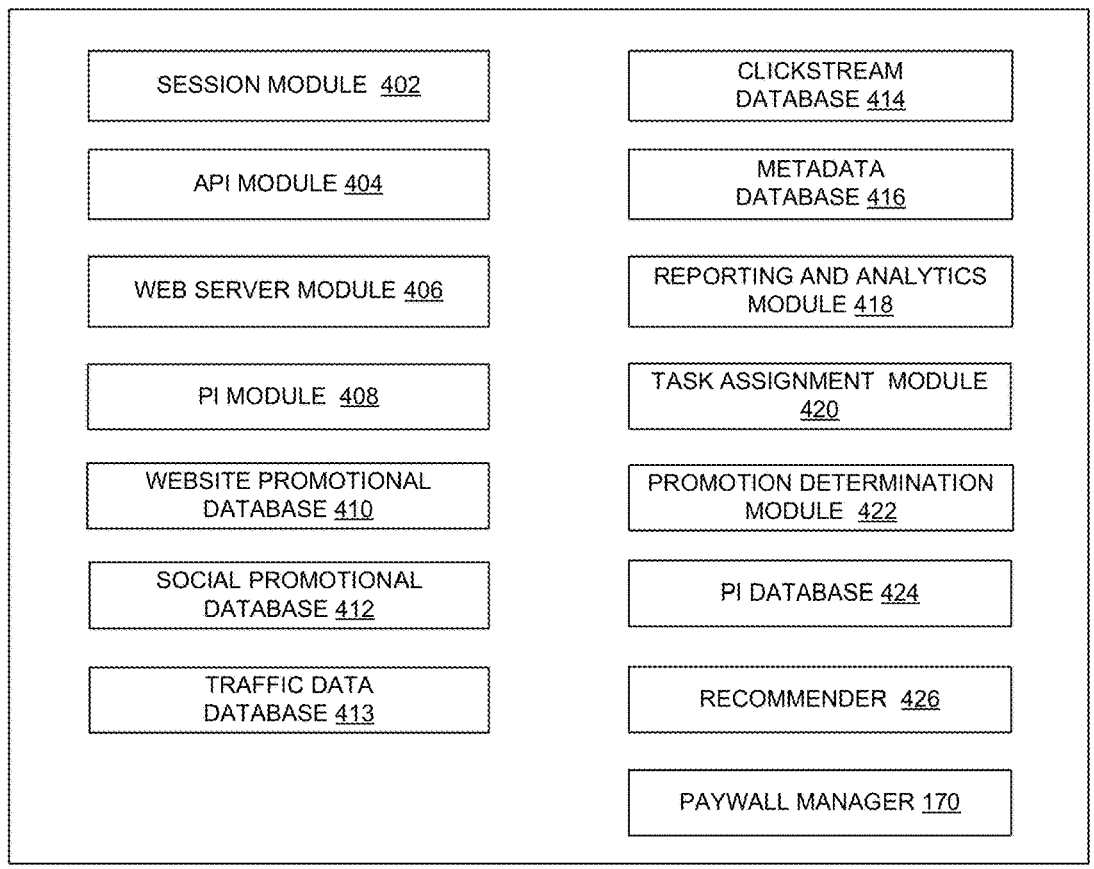
FIG. 4 is a block diagram of functional components of the data manager of FIG. 3 in accordance with one example embodiment of the present disclosure.

FIG. 4 is a block diagram of functional modules of the data manager 120 in accordance with one example embodiment of the present disclosure. The functions described in connection with FIG. 4 may be performed by one or more components of the data manager 120. As shown in FIG. 4, data manager 120 may comprise a session module 402, an application programming interface (API) module 404, a Web server module 406, a performance indicator (PI) module 408, a website promotion database 410, a social media promotion database 412, a traffic data database 413, a clickstream database 414, a metadata database 416, a reporting and analytics module 418, a task assignment module 420, a promotion determination module 422, a performance indicator (PI) database 424, a recommender engine 426, and paywall manager 170. Although the databases 410, 412, 413, 414, and 416 are shown as separate databases, in other embodiment the database may be combined in a single database, such as a Mongo™ database.

The session module 402 manages access to the data manager 120. Access to the data manager 120 is limited to registered users. Each registered user has a user account stored in a user registry stored in a user account database (not shown) of the data manager 120. Each user has unique user credentials stored in the user account database, such as a username or user identifier (ID) and password or personal identifier plurality (PIN), for logging into and accessing the data manager 120. The data manager 120 may be accessed, for example, by a website or dedicated (standalone) application, as described below. The session module 402 receives user login information and attempts to authenticate the user. When a user is authenticated, the session module 402 may receive a session token and send the session token to a corresponding client device 110. Users may have user data, such as reports and task assignments, stored in a session database (not shown) of the data manager 120.

The API module 404 is used to extract, transform, and combine PIs along with additional information such as content metadata from the content repository. When the digital media platform is a digital newspaper, the content metadata may comprise a headline, byline, publish time, section, paywall category, topics, keywords, etc. and changes in these elements. The API module 404 provides the aggregated information to visualization tools that provide a user frontend for display and interaction examples of which are described below, and as well as to other processing modules such as the reporting and analytics module 418, task assignment module 420 and promotion determination module 422.

The API module 404 provides a plurality of APIs that may be used by an authenticated service to retrieve the data from the various databases of the data manager 120. The metadata and changes in metadata of the pages of the designated website are stored in a metadata database 416 (FIG. 4) of the data manager 120. The metadata can be used by the API module 404 to filter for specific items based on the headline, byline, publish time, section, paywall category, topics, keywords, etc. The filter settings are set by user input, and may be used by user to generate custom screens via the visualization tools, described below.

The APIs query, aggregate and transform the data stored in the databases. In some embodiments, the APIs receive as input at least a date range to filter the results, and a selection of one or more metrics for processing. Possible metrics comprise: one or more performance indicators (e.g., individual performance indicators used in determining an overall performance indicator as well as the overall performance indicator determined therefrom), raw visits, engagement, and/or recirculation. When the selected metric comprises a performance indicator, the APIs may calculate the selected performance indicator in real-time or use a previously calculated performance indicator stored by the data manager 120, depending on the calling API. Other inputs to the APIs that may be used to filter the results even further comprising a section name, keyword and/or publication date range. A list of example APIs is provided below in Table 1.

described in more detail below. The performance indicators and overall performance indicator are calculated and stored in the performance indicator database 424 in real-time. Alternatively, the performance indicators and overall performance indicator may be performed at regular intervals to reduce the required computational resources, for example, every 2 minutes. The performance indicators in the performance indicator database 424 may be used by various APIs of the API module 404. The performance indicator module 408 may be implemented using Spark Scala or other suitable technologies for real-time processing of data.

The Web server module 406 supports a number of visualization tools in the form of interactive graphical user interfaces. The visualization tools may comprise a dedicated (standalone) web application accessible to users of a client device 110 and a head-up display (HUD) or widget, described in detail below.

The reporting and analytics module 418 may be used to perform an analysis of the data contained in the various databases of the data manager 120, generate custom reports therefor, and print data and reports. The reporting and analytics module 418 is a backend feature which supports the web application and HUD.

The task assignment module 420 may be used to identify potential new content, such as topics for new content, and dynamically allocate task assignments based on identified topics for new content based on one or more performance

TABLE 1

Example Application Programing Interfaces (APIs)

| API | Inputs | Function |
| --- | --- | --- |
| GET digital content items | startDate, endDate, metric | returns a list of the top digital content items based on the input metric<br>aggregates the raw metrics between the selected dates<br>augments the results with metadata for the digital content item<br>augments the results with social media promotion data |
| GET digital content item | startDate, endDate, metric, ID | returns the results for one digital content item based on the ID provided<br>aggregates the raw metrics between the selected dates<br>augments the results with metadata for the digital content item<br>augments the results with the social media promotion data<br>augments the results with website promotion data collected from the web crawlers |
| GET sections | startDate, endDate, metric | returns a list of the top sections based on the input metric<br>aggregates the raw metrics between the selected dates at a section level |
| GET authors | startDate, endDate, metric | returns a list of the top authors based on the input metric<br>aggregates the raw metrics between the selected dates at an author level |
| GET keywords | startDate, endDate, metric | returns a list of the top keywords based on the input metric<br>aggregates the raw metrics between the selected dates at a keyword level (i.e., the keywords associated with each digital content item) |

The performance indicator module 408 analyzes the clickstream data, website promotion data, social media promotion data, and metadata to calculate various performance indicators comprising an overall performance indicator for each digital content item on the digital media platform, as indicators of existing digital content items on the digital media platform. The task assignments may specify one or a combination of content generator (e.g., author), topic, or due dates, among many parameters. The task assignments may be semi-automated or fully automated, depending on the embodiment or mode. In a semi-automated embodiment or mode, the task assignment module 420 may suggest task assignments, which must be approved by an editor or the like. In a fully automated embodiment or mode, the promotion determination module 422 automatically allocates task assignments without user involvement. The task assignment module 420 may use artificial intelligence and/or machine learning in decision making. Task assignments may be distributed automatically by electronic messaging, such as instant messaging or email. The task assignment module 420 may automatically generate an electronic message with the task assignments parameters and send the electronic message without user involvement. The electronic message may be sent on behalf of the editor or the like so that the content generator (e.g., author) may respond directly to the editor or the like about the task assignment, by simply replying the electronic message in the conventional way.

The promotion determination module 422 may be used to dynamically locate digital content items on the digital media platform to increase the promotion of particular digital content items based on one or more performance indicators to achieve one or more performance objectives of the operator of the digital media platform. The dynamic location of content on the digital media platform may be semi-automated or fully automated, depending on the embodiment or mode. In a semi-automated embodiment or mode, the promotion determination module 422 may suggest locations on the digital media platform, e.g. sections or locations within sections, for particular digital content items, which must be approved by an editor or the like. The approval may be on a per item basis, section basis, widget pages, or all or none basis. For example, a GUI may be provided to allow an editor to easily approve or disapprove a location or re-location of content on an individual or group basis. When approved by the editor, the promotion determination module 422 may automatically locate or re-locate the particular digital content items across the digital media platform. In a fully automated embodiment or mode, the promotion determination module 422 automatically locates or re-locates the content without user involvement. The promotion determination module 422 may use artificial intelligence and/or machine learning in decision making.

The recommender engine 426 interacts with client devices 110 accessing the designated website via the internet browser 284. The recommender engine 128 uses one or more of the performance indicators, such as the overall performance indicator, and the user's recent history generated by the data manager 120 to select one or more content items to be recommended within one or more widgets present to the user in section or content pages. The recommender engine 128 determines a location associated with a user of the client device 110 via the IP address of the client device 110, receives and analyses one or more designated cookies stored by the internet browser 284 of the client device 110, web page metadata, a type of the user (determined from the user's login status), and any stored historical user data (when the user is a registered user) to filter content pages available on the designated website to identify content pages that may be of interest to the user. The recommender engine 128 considers historical content items. The time cutoff for historical content items may vary, for example based on how cutoff impact engagement with the content recommendations.

The recommender engine 128 comprises a widget manager (not shown) that determines and dynamically updates the promotions in one or more widgets in accordance with the identified content pages. The widgets driven by the recommender engine 128 may vary. Promotions within the widget may be a predetermined number based on one or a combination of the closest matching or most recent content items, among other possible factors.

Client Device

Reference is next made to FIG. 2 which illustrates in simplified block diagram form an example client device 110 in the form of a mobile wireless communication device 110 suitable for use in the multi-source data analytics system 100 of the present disclosure. As noted above, the client devices 110 may be fixed (or desktop) personal computers or mobile wireless communication devices. The client device 110 comprises a controller comprising at least one processor 202 (such as a microprocessor) which controls the overall operation of the client device 110. The processor 202 is coupled to a plurality of components via a communication bus (not shown) which provides a communication path between the components and the processor 202.

The processor 202 is coupled to Random Access Memory (RAM) 222, Read Only Memory (ROM) 224, persistent (non-volatile) memory 226 such as flash memory, one or more wireless transceivers 230 for exchanging radio frequency signals with a wireless network that is part of the communication network 112, a satellite receiver 232 for receiving satellite signals from a satellite network 260 that comprises a plurality of satellites which are part of a global or regional satellite navigation system, and a touchscreen 234.

The client device 110 also comprises a camera 240, sensors 242, auxiliary input/output (I/O) subsystems 250, data port 252 such as serial data port (e.g., Universal Serial Bus (USB) data port), speaker 256, microphone 258, a short-range communication subsystem 262, and other device subsystems 264. The sensors 242 may comprise any one or a combination of a motion sensor, an orientation sensor, electronic compass, altimeter, or proximity sensor. The client device 110 also comprise additional input devices such as buttons, switches, dials, a keyboard or keypad, or navigation tool, depending on the type of client device 110, and other additional devices such as a vibrator or light-emitting diode (LED) notification light, depending on the type of client device.

A graphical user interface (GUI) of the client device 110 is rendered and displayed on the touchscreen 234 by the processor 202. A user may interact with the GUI using the touchscreen and optionally other input devices (e.g., buttons, dials) to display relevant information. For example, when the digital media application 286 is a news application, the user may interact with the GUI to interact with news digital content items, which may be digital editions of newspaper digital content items or other digital media, etc. The GUI may comprise a series of traversable content specific menus. User interaction may comprise viewing, sharing, printing, or commenting on news digital content items.

The wireless transceivers 230 comprise one or more cellular (RF) transceivers for communicating with a radio access network (e.g., cellular network). The wireless transceivers 230 may communicate with any one of a plurality of fixed transceiver base stations of a cellular network within its geographic coverage area. The wireless transceivers 230 may comprise a multi-band cellular transceiver that supports multiple radio frequency bands. The wireless transceivers 230 may also comprise a WLAN transceiver for communicating with a WLAN via a WLAN access point (AP). The WLAN may comprise a Wi-Fi wireless network which conforms to IEEE 802.11x standards (sometimes referred to as Wi-Fi®) or other communication protocol.

Operating system software 282 executed by the processor 202 is stored in the persistent memory 226 but may be stored in other types of memory devices, such as ROM 224 or similar storage element. A plurality of applications 282 executed by the processor 202 are also stored in the persistent memory 226. The applications 282 comprise a Web browser 284 and a digital media application 286. Other applications such as mapping, navigation, media player, telephone and messaging applications, etc. are also stored in the memory 226. The Web browser 284 or digital media application 286, when executed by the processor 202, allows the client device 110 to communicate with the data manager 120 in accordance with the methods described herein. The digital media application 286 may be a news application. Substantially the same functionality as the digital media application 286 may be obtained by using the Web browser 284 to access a website of the data manager 120 in at least some embodiments.

The memory 226 also stores a variety of data 288. The data 288 may comprise sensor data sensed by the sensors 242, user data 184 comprising user preferences, settings and optionally personal media files (e.g., music, videos, directions, etc.), a download cache comprising data downloaded via the wireless transceivers 230, and saved files. System software, software modules, specific device applications, or parts thereof, may be temporarily loaded into a volatile store, such as RAM 222, which is used for storing runtime data variables and other types of data or information. Communication signals received by the client device 110 may also be stored in RAM 222. Although specific functions are described for various types of memory, this is merely one example, and a different assignment of functions to types of memory may be used in other embodiments.

The client device 110 also comprises a battery 228 as a power source, such as one or more rechargeable batteries that may be charged, for example, through charging circuitry coupled to a battery interface such as the serial data port 252.

Performance Indicators

The performance indicator module 408 determines a number of metrics in order to calculate three primary performance indicators for each digital content item in a plurality of digital content items: a first performance indicator, a second performance indicator, and an overall performance indicator based on the first performance indicator and second performance indicator. The plurality of digital content items may be all digital content items in the database 180 or a subset thereof, depending on the embodiment. The three primary performance indicators are described in detail below.

User Performance Indicator

The first performance indicator is a user performance indicator. The user performance indicator is calculated by the data manager 120 based on traffic data and promotion data. The user performance indicator measures performance of a digital content item in terms of user interaction with the digital content item generally. The user performance indicator considers traffic data irrespective of whether access to the digital content item is restricted by the paywall of the digital media platform. The user performance indicator measures user interaction with a particular digital content item based on a plurality of factors comprising the number of user interactions, the amount of engagement, and the amount of recirculation. The type of user interaction, engagement and recirculation may depend upon the type of digital content item. For one example, when the digital content item is an article or other text, user interaction may be measured by a number of page views. For another example, when the digital content item is streamed audio or video, user interaction may be measured by a number of plays.

The number of interactions is a measure of the number of times a particular digital content item has been accessed (e.g., viewed, sent, streamed, etc.) and optionally a number of attempts to access the particular digital content item based on the clickstream data, depending on the embodiment. The application server 114 and data manager 120 use clickstream data to differentiate between user interactions by user type, i.e. subscriber or anonymous in some embodiments. The application server 114 and data manager 120 may use clickstream data to differentiate between to subscribers, registered users or anonymous in other embodiments. Regardless, however, the number of interactions is user agnostic—only the number of interactions for the particular digital content item are measured. The data manager 120 does not differentiate between interactions by the same or different users. For example, if a given user views a particular digital content item twice, two interactions (e.g., page views) would be measured. To reduce multiple views by the same user in a session, views generated by users using the back button of the browser are typically only counted once.

The amount of engagement is a measure of an amount of time users spent interacting with a particular digital content item, for example, viewing a particular article. The amount of engagement is determined by calculating a value of an engagement index in accordance with the following equation:

$$\text{Engagement Index} = \frac{\text{Time Spent}}{\text{Average Time Spent}} \quad (1)$$

wherein the parameter Time Spent in equation (1) represents an average time spent (e.g., in minutes) by users interacting with (e.g., viewing, playing, or a combination thereof etc.) a particular digital content item, and the parameter Average Time Spent represents an average time spent (e.g., in minutes) by users interacting with a digital content item averaged over all digital content items available on the digital media platform in an evaluation period. The duration of the evaluation period may be configurable. In some examples in which the digital media platform is a digital newspaper and the digital content items are primarily news articles, the evaluation period may be measured in weeks. In one example, the evaluation period is 4 weeks. An evaluation period of 4 weeks (28 days) has been found to balance out any outliers and fluctuations in the news cycle, ensures that the same number of weekends and weekdays, and was of sufficient duration to provide a balance between recent events. The evaluation period may be a different number of weeks in other examples. When the digital content items are different than news articles, the evaluation period may not be measured in weeks. For example, when the digital content items are audio or video clips, such as a music tracks, the evaluation period may be one or more months. A configurable upper and lower limit may be applied to the engagement index to avoid extreme values.

The amount of recirculation is a measure of an amount that users interact with additional digital content items on the digital media platform in response to interacting with a particular digital content item. For example, after a user views a particular digital content item, does the user continue to other areas of the digital media platform. The amount of recirculation is determined by calculating a value of an recirculation index in accordance with the following equation:

$$\text{Recirculation Index} = \frac{\text{Recirculation}}{\text{Average Recirculation}} \quad (2)$$

A configurable upper and lower limit may be applied to the recirculation index to avoid extreme values. The parameter Recirculation in equation (2) has a value defined by equation (3):

$$\text{Recirculation} = 1 - \frac{\text{bouncers}}{\text{visitors}} \quad (3)$$

The parameter bouncers in equation (3) represents a number of users who did not interact with additional digital content items on the digital media platform after interacting with a digital content item, for example, users who did not view another digital content item on the digital media platform after viewing the digital content item. The parameter visitors in equation (3) represents a number of individual user interactions with a digital content item in the evaluation period regardless of user type.

The user performance indicator is determined according to the following equation:

$$\text{User PI} = \text{Internal PI} + \text{Search PI} + \text{Social PI} + \text{Direct PI} \quad (4)$$

The parameter Internal PI relates to internal traffic directed from a page of the digital media platform, the parameter Search PI relates to search traffic directed from a search engine (e.g., Google™, Bing™, Yahoo™ or the like), the parameter Social PI relates to social traffic directed from a social network (e.g., Facebook™, Instagram™, Twitter™ or the like), and the parameter Direct PI relates to all other traffic such as direct traffic from users who follow a link or input a URL to digital content item page and unknown traffic. The parameters Internal PI, Search PI, Social PI and Direct PI in equation (4) are determined from clickstream data according to the following equations:

$$\text{Internal PI} = \text{Adjusted Interactions} \times \text{Engagement Index} \times \text{Recirculation Index} \times \text{Value} \quad (5)$$

$$\text{Search PI} = \text{Interactions}_{search} \times \text{Engagement Index}_{search} \times \text{Recirculation Index}_{search} \times \text{Value} \quad (6)$$

$$\text{Social PI} = \text{Interactions}_{social} \times \text{Engagement Index}_{social} \times \text{Recirculation Index}_{social} \times \text{Value} \quad (7)$$

$$\text{Direct PI} = \text{Interactions}_{direct} \times \text{Engagement Index}_{direct} \times \text{Recirculation Index}_{direct} \times \text{Value} \quad (8)$$

The parameter Value in equations (5) to (8) is an enterprise value of user interaction. The basis of the parameter Value may vary between embodiments. In at least some embodiments, the parameter Value may be a monetary value. In some examples, the monetary value may be the price of an advertisement. The value of the parameter Value may be fixed or may vary between digital content items. For example, the value of the parameter Value may vary based on a classification of the digital content item (e.g., premium vs. standard), the type of digital content item, or a location of the digital content item on the website (e.g., section of the website). Furthermore, although the parameter Value is the same in equations (5) to (8), the value of the parameter Value may vary based on the traffic type in other embodiments.

The parameter Adjusted Interactions in equation (5) represents an overall number of interactions with the particular digital content item (e.g., visits or views of the particular digital content item) adjusted for promotion on the digital media platform using website promotion data. The parameter Adjusted Interactions attempts to normalize the Internal PI parameter for promotion because digital content items presented at high traffic locations (i.e., popular locations such as the top of a section page), attract more user attention than digital content items presented at low traffic locations (i.e., unpopular locations such as at the bottom of a section page) and consequently receive more interactions (e.g., page visits). Similarly, digital content items having a promotion with greater emphasis (e.g., such as a headline or link displayed in larger text, displayed with a photo, and/or displayed with a content preview, etc.), attract more user attention than digital content items having a promotion with less emphasis (e.g., such as a headline or link displayed in smaller text, displayed without a photo, and/or displayed without a content preview etc.) and consequently receive more interactions (e.g., page visits).

Adjustments for promotion take into account four parameters: (1) the number of interactions (e.g., visits or page views) that a digital content item receives while being promoted at one or more particular locations during a particular period of promotion; (2) a depth of each promotion for the digital content item with respect to a height of each page on which the digital content item was promoted; (3) the size of each promotion of the digital content item, i.e., the screen area of each promotion in terms of pixels; (4) the number of interactions (e.g., visits or page views) that to each page on which the digital content item was promoted during the same period of promotion; and (5) a traffic distribution for the particular page on which the digital content item is promoted. It will be appreciated that unique visits, e.g. once per visitor per session, may be used instead of views in other embodiments.

For digital content items behind the paywall, the number of interactions is limited to subscribers who viewed the promotion for the digital content item because non-subscribers cannot access digital content items behind the paywall. The depth of the promotion of the digital content item with respect to a height of a page on which the digital content item is promoted is provided by the web crawlers 122, typically in terms of percentages. The period of promotion may vary depending on the type of digital content item on the digital media platform, a rate at which new content is added to the digital media platform, and a rate at which the website of the digital media platform is updated, among other possible factors. When the digital media platform is a digital newspaper, the period of promotion may be 30 minutes.

The traffic distribution for the page is a page depth histogram calculated using clickstream data to determine an amount that users typically scroll down a page, for example, an average scroll depth during the period of promotion. The average scroll depth is specific to each page on the website. The traffic analyzer 126 determines a traffic distribution (i.e., page depth histogram) for each section page and each content page, and stores the traffic distribution along with other traffic data in the traffic data database 413. Alternatively, for each visitor the links which are provided (e.g., sent) to the user's viewport may be collected and stored. Typically, the traffic distribution is calculated at each iteration of the method described herein to increase accuracy.

However, the traffic distribution could be determined less often, for example, at major updates to the website of the digital media platform and stored by the data manager 120.

An estimate of a number of exposures of a particular promotion for a digital content item is calculated by the data manager 120 using the depth of the particular promotion for a digital content item with respect to a height of the particular page on which the digital content item was promoted, the size of the particular promotion for the digital content item, the number of views of the particular page on which the digital content item was promoted during the same period of promotion, and the traffic distribution for the particular page on which the digital content item is promoted.

An exposure of a particular promotion for a digital content item is not the same as a page view because, even though a page is rendered and displayed on a client device 110, users may not been exposed to the particular promotion due to the depth at which the promotion is located and the scroll depth of the particular user when the page is rendered and displayed. Instead, the number of exposures of a particular promotion for a digital content item is an estimate of the number of users who viewed the promotion or were exposed to the promotion—this is also known as "eyes". Although page views can be measured via clickstream data, the number of exposure or "eyes" is an estimation only.

The parameter Adjusted Interactions is determined in accordance with the following equation:

$$\text{Adjusted Interactions} = \text{Total Interactions}/\text{Promotion Ratio} \tag{9}$$

The parameter Total Interactions in equation (9) is a number of interactions (e.g., page views) with the particular digital content item during the evaluation period and the parameter Promotion Ratio is calculated according to the following equation:

$$\text{Promotion Ratio} = \text{Number of Exposures}/\text{Average Number of Exposures} \tag{10}$$

The parameter Number of Exposures is an estimate of a number of exposures of a particular promotion for a digital content item calculated by the data manager 120 during the period of promotion, and the parameter Average Number of Exposures is an estimate of a number of exposures of an average digital content item promoted on the same page calculated by the data manager 120 during the same period of promotion. A configurable upper and lower limit may be applied to the Number of Exposures to avoid extreme values. In addition, a configurable upper and lower limit may be applied to the Promotion Ratio to avoid extreme values.

Subscriber Performance Indicator

The second performance indicator is a subscriber performance indicator. The subscriber performance indicator is calculated by the data manager 120 based on traffic data and promotion data. In contrast to the user performance indicator which measures an enterprise value generated as a result of user interaction with a digital content item generally, the subscriber performance indicator exclusively measures an enterprise value generated as a result of new and existing subscriber interaction with a digital content item.

The subscriber performance indicator is determined according to the following equation:

$$\text{Subscriber PI} = \text{Acquistion PI} + \text{Retention PI} \tag{11}$$

The parameter Acquistion PI represents a measure of the contribution of a digital content item in generating a new subscription, i.e., acquiring a new subscriber. The parameter Acquisition PI is determined according to the following equation:

$$\text{Acquisition PI} = \text{Adjusted Subscriptions} \times \text{Subscription Value} \tag{12}$$

The parameter Adjusted Subscriptions in equation (12) is a measure of the particular digital content items contribution to acquiring new subscriptions, and the parameter Subscription Value is an enterprise value of a new subscription by the operator of the digital media platform. The value of the parameter Subscriber Value may be determined in many ways, depending on the embodiment. The parameter Subscription Value may be a monetary value such as a lifetime value (LTV) of a subscription or an average monthly subscription fee that subscribers pay. For example, the value of the parameter Subscription Value in be ½ the LTV of a subscription in some embodiments. The LTV value is divided in half to prevent double counting the retention value embedded in the Retention PI, described below.

The parameter Adjusted Subscriptions adjusts the subscription performance indicator for the particular digital content item so that digital content items that were heavily promoted are not given an unfair advantage because promoted digital content items will tend to appear more frequently in new subscribers' histories. The parameter Adjusted Subscriptions is based on a number of new subscribers (or subscriptions) adjusted according to a subscription attribution model. The subscription attribution model is based on a discovery by the Applicant that a majority of new subscriptions are generated as a result of a collective experience on the digital media platform rather than the desire to access a particular digital content item behind the paywall or the experience of accessing a particular digital content item provided behind the paywall, using data obtained by offering free trial subscriptions. In a study performed by the Applicant, subscription analysis showed that approximately 75% of new subscriptions were based on factors other than access to subscriber only items 182 behind the paywall.

Adjusting the subscriber data involves assigning a partial subscription credit to all digital content items in each new subscriber's history, determined from clickstream data, within the evaluation period. For each new subscriber (or subscription), a partial subscription credit is assigned to all digital content items in the new subscriber's history during the evaluation period. The partial subscription credit may be based on a full enterprise value or a discounted enterprise value if the subscription was discounted, based on the applicable business rules. The use of a discounted enterprise value for the partial subscription credit may increase the accuracy of measuring the value of a digital content item by addressing the possibility that some users may be influenced to subscribe because the user had a discount while others may not be so influenced.

The user history identifies all digital content items that a user access and/or attempts to access (i.e., interacts with), e.g., viewed, or attempted to access, depending on the example. If the new subscription was generated when the user was not presented with the paywall, each of the digital content items in the new subscriber's history is assigned the same partial subscription credit. If the new subscription was generated after the new subscriber was presented with the paywall, the digital content item behind the paywall is assigned a larger partial subscription credit than the other content items in the new subscriber's history. In some examples, the digital content item is assigned the full subscription credit if the new subscription was generated after the new subscriber was presented with the paywall when the user attempted to access the digital content item.

The partial subscription values for the particular digital content item being assessed are adjusted for promotion in a similar manner as the parameter Adjusted Interactions as described above. The parameter Adjusted Subscriptions in equation (12) is determined according to the following equation:

$$\text{Adjusted Subscriptions} = \text{Total Subscriptions} / \text{Promotion Ratio} \quad (13)$$

The parameter Total Subscriptions is a total of a number of full subscription credits and partial subscription credits. A full subscription credit is allotted for a digital content item when a new subscription is generated in response to presenting the new subscriber with the paywall. A partial subscription credit is allotted for digital content item in the new subscriber's history when a new subscription is not generated in response to presenting the new subscriber with the paywall. The partial subscription credit is calculated according to the following equation:

$$\text{Partial Subscription credit} = \frac{\text{Full Subscription Credit}}{\text{Number of digital content items in new subscriber's history prior to subscription}} \quad (14)$$

The parameter Retention PI in equation (11) measures an amount that a particular digital content item contributes to retaining existing subscribers, for example, by the keeping existing subscribers satisfied. The parameter Retention PI represents a share of the enterprise value of existing subscribers, adjusted by a Retention Index, which is a measure of popularity of the particular digital content item amongst subscribers. The parameter Retention PI is based on a Retention Index determined according to the following equation:

$$\text{Retention Index} = \frac{\text{Adjusted Interactions}_{subscribers}}{\text{Average Adjusted Interactions}_{subscribers}} \quad (15)$$

The parameter Adjusted Interactions$_{subscribers}$ in equation (15) represents an adjusted number of subscriber interactions (e.g., visits) with the particular digital content item during the evaluation period adjusted for promotion in a similar manner as the parameter Adjusted Interactions as described above, and the parameter Average Adjusted Interactions$_{subscribers}$ represents an average adjusted number of subscriber interactions (e.g., visits) averaged over all digital content on the digital media platform during the evaluation period adjusted for promotion in a similar manner as the parameter Adjusted Interactions as described above. The parameter Retention PI is determined according to the following equation:

$$\text{Retention } PI = \frac{\text{Retention Index} \times \text{Number of Subscribers} \times \text{Subscriber Value}}{\text{Number of Digital Content Items}} \quad (16)$$

The parameter Number of Subscribers is the number of subscribers in the evaluation period, the parameter Number of Digital Content Items is a number of digital content items available on the digital media platform during the evaluation period, and the parameter Subscriber Value is a value attributed to each subscriber over the evaluation period. The parameter Subscriber Value may be a monetary value. In some examples, the value of the parameter Subscription Value is the same as the parameter Subscription Value used in equation (12) for calculating the Acquisition PI. For example, the value of the parameter Subscription Value may be ½ the LTV of a subscription in some embodiments.

Overall Performance Indicator

The overall performance indicator is calculated by the data manager 120 based on the user performance indicator and the subscriber performance indicator. The overall performance indicator of the particular digital content item may represent an enterprise value of digital content item to the operator of the digital media platform. The overall performance indicator is determined according to the following equation:

$$\text{Overall PI} = \text{User PI} + \text{Subscriber PI} \quad (17)$$

The parameter $\omega_1$ is a weight applied to the User PI and $\omega_2$ is a weight applied to the Subscriber PI. The weights $\omega_1$, $\omega_2$ associated with each of the first performance indicator and second performance indicator are configurable. The parameters $\omega_1$, $\omega_2$ may be omitted in other embodiments or the values of the weights $\omega_1$ and $\omega_2$ may be the so both the User PI and the Subscriber PI have an equal weighting. This reflects that inherent weights may be present in the calculation of the User PI and the Subscriber PI in some embodiments. However, weights can be set to favor either the User PI or Subscriber PI in the calculation of the overall PI if desired.

Multi-Source Analytical Method

Figure 5:
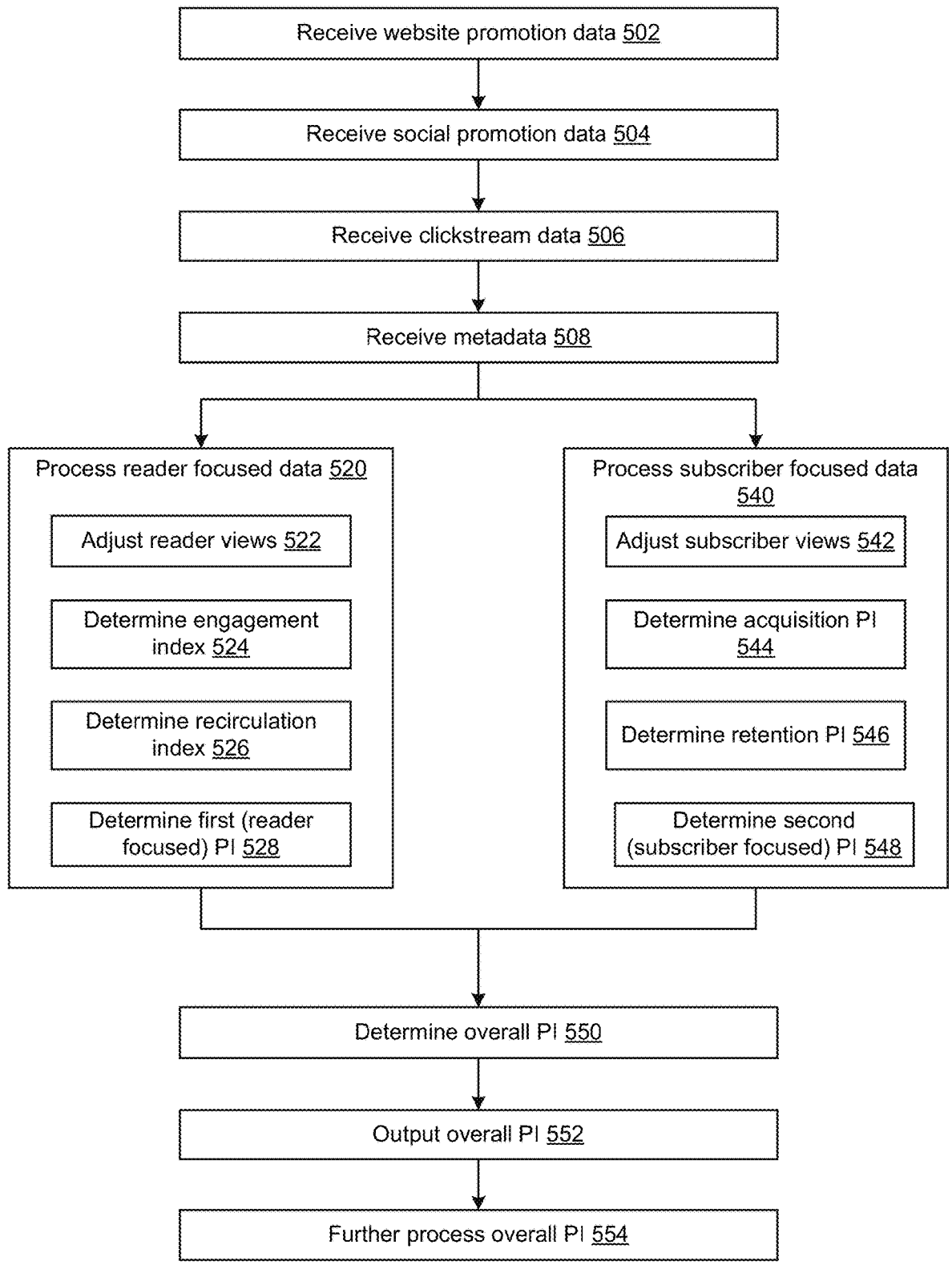
FIG. 5 is a flowchart illustrating a method of digital content management in accordance with one example embodiment of the present disclosure.

Referring next to FIGS. 5 and 6, a method 500 of digital content management in accordance with one example embodiment of the present disclosure will be described. FIG. 5 is a flowchart illustrating the example method 500 and FIG. 6 is a dataflow diagram illustrating the example method 500.

At operation 502, website promotion data is collected by the web crawlers 122 and sent to the data manager 120, which receives the website promotion data, which stores the website promotion data in the website promotion database 410.

At operation 504, social promotion data is collected by the social media platform crawlers 124 and sent to the data manager 120, which receives the website promotion data, which stores the social promotion data in the social promotion database 412.

At operation 506, clickstream is collected by the traffic analyzer 126 and sent to the data manager 120, which receives the clickstream data, which stores the clickstream data in the clickstream database 414.

At operation 508, metadata is collected by the web crawlers 122 is sent to the data manager 120, which receives the metadata, which stores the metadata in the metadata database 416.

At operation 520, user data is extracted from the clickstream database 414 for the evaluation period and processed to determine the user performance indicator for each of the different traffic types, namely internal traffic directed from a page of the digital media platform, search traffic directed from a search engine, social traffic directed from a social network and other traffic. First, the number of visits (page views) by users is adjusted for promotion to normalize the data (operation 522). Next, the engagement index is determined as described above (operation 524). Next, the recirculation index is determined as described above (operation 526). Next, the user performance indicator is determined for each of the different traffic types using the respectively number of adjusted visits (page views), engagement index and recirculation index as described above (operation 528).

At operation 540, subscriber data is extracted from the clickstream database 414 for the evaluation period and processed to determine the subscriber performance indicator. First, the number of visits (page views) by subscribers is adjusted for promotion to normalize the data (operation 542). Next, the acquisition performance indicator is determined as described above (operation 544). Next, the retention performance indicator is determined as described above (operation 546). Next, the user performance indicator is determined for each of the different traffic types using the respectively number of adjusted visits (page views), engagement index and recirculation index as described above (operation 548).

At operation 550, an overall performance indicator is determined by the data manager 120 from the user performance indicator and the subscribed performance indicator calculated in preceding operations.

At operation 552, one or a combination of the first performance indicator, second performance indicator or the overall performance indicator calculated by the data manager 120 is output for further processing.

At operation 554, one or a combination of the first performance indicator, second performance indicator or the output overall performance indicator undergoes further processing. The further processing may comprise reporting and analytics, and outputting the results to a display of a client device 110. The further processing may comprise identifying topics for new content and dynamically allocating task assignments based on identified topics for new content, as described above. The further processing may comprise dynamically locating (or relocating) digital content items on the digital media platform to increase the promotion of particular digital content items to reflect the priorities of the operator of the digital media platform. For example, the promotion of digital content items having a higher overall performance indicator may be increased, for example, by relocating those digital content items to more prominent/visible areas of the website.

Visualization Tools

The Web server module 406 supports a number of visualization tools in the form of interactive graphical user interfaces, as noted above. The visualization tools may comprise a dedicated (standalone) web application accessible to users of a client device 110 and the HUD (head-up display) or widget, described in detail below. The web application requests data from the data manager 120 using an API. The web application may be used to view data in an easily interpretable format, generate reports, and print data and reports, etc. The web application is the main portal for users to interact with the data manager 120 and the underlying data. The web application regularly updates the presented data in real-time, for example, by polling the API for new data. In some embodiments, users may be able to change the frequency of data refresh intervals. Typically, intervals are 2 to 5 minutes but could be more or less in other embodiments. The web application may be implemented using a combination of NodeJS, React and Redux or other suitable web technologies for handling continuously changing data, i.e., real-time data.

The web application provides a user interface for generating views illustrating the performance for each digital content item, filter (or sort) and compare digital content items based on various performance indicators. The user interface allows users to filter results based on a number of parameters such as content type, section, article paywall category, keywords and published date. The user interface also illustrates performance indicators aggregated at the section, author, keyword, and content type level.

Figure 9:
FIGS. 9 to 20 are example user interface screens of a web application provided by the data manager of the present disclosure in accordance with a first embodiment.
Figure 10:
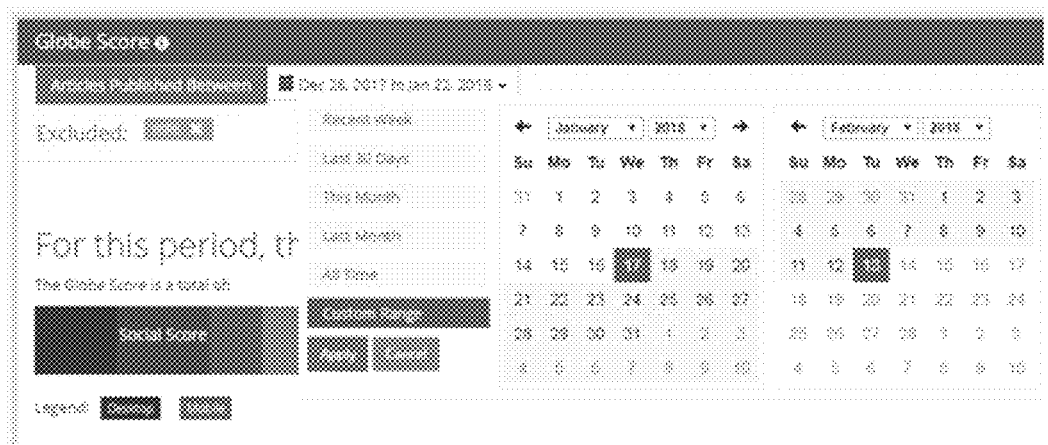

FIGS. 9 to 20 are example user interface screens of the web application provided by the data manager 120 of the present disclosure in accordance with a first embodiment. FIG. 9 shows an overview screen (or view) of the web application referred to as "SOPHI". The overview screen includes a first panel showing the average overall performance indicator (referred to as a "Globe Score") over a selected period, broken down into its consistent elements. The overview screen also includes a second panel showing the top digital content items (referred to as "articles"). The overview screen also includes a third panel including an interactive graph showing section activity and performance. The interactive graph shows the average overall performance indicator per action for each section as well as the percentage of articles and percentage of adjusted interactions (referred to as "eyes") for each section. FIG. 10 shows a filter panel which allows a user to set filter period for the overview screen. The type of content (e.g., articles (e.g., digital newspaper articles, scholarly articles, or the like), recipes, blogs, videos, image galleries, or financial analysis or reports) which is included in the overview screen may be selected by another panel (not shown).

Figure 11:
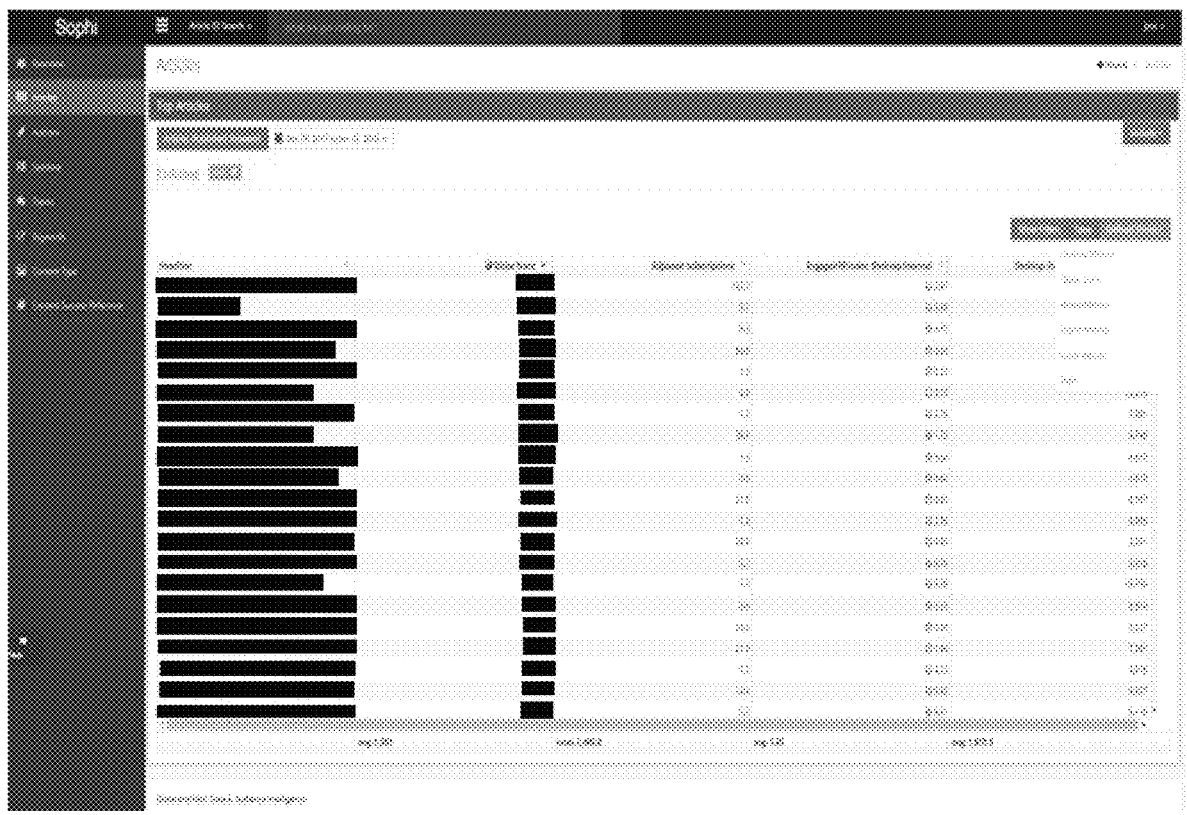
Figure 12:
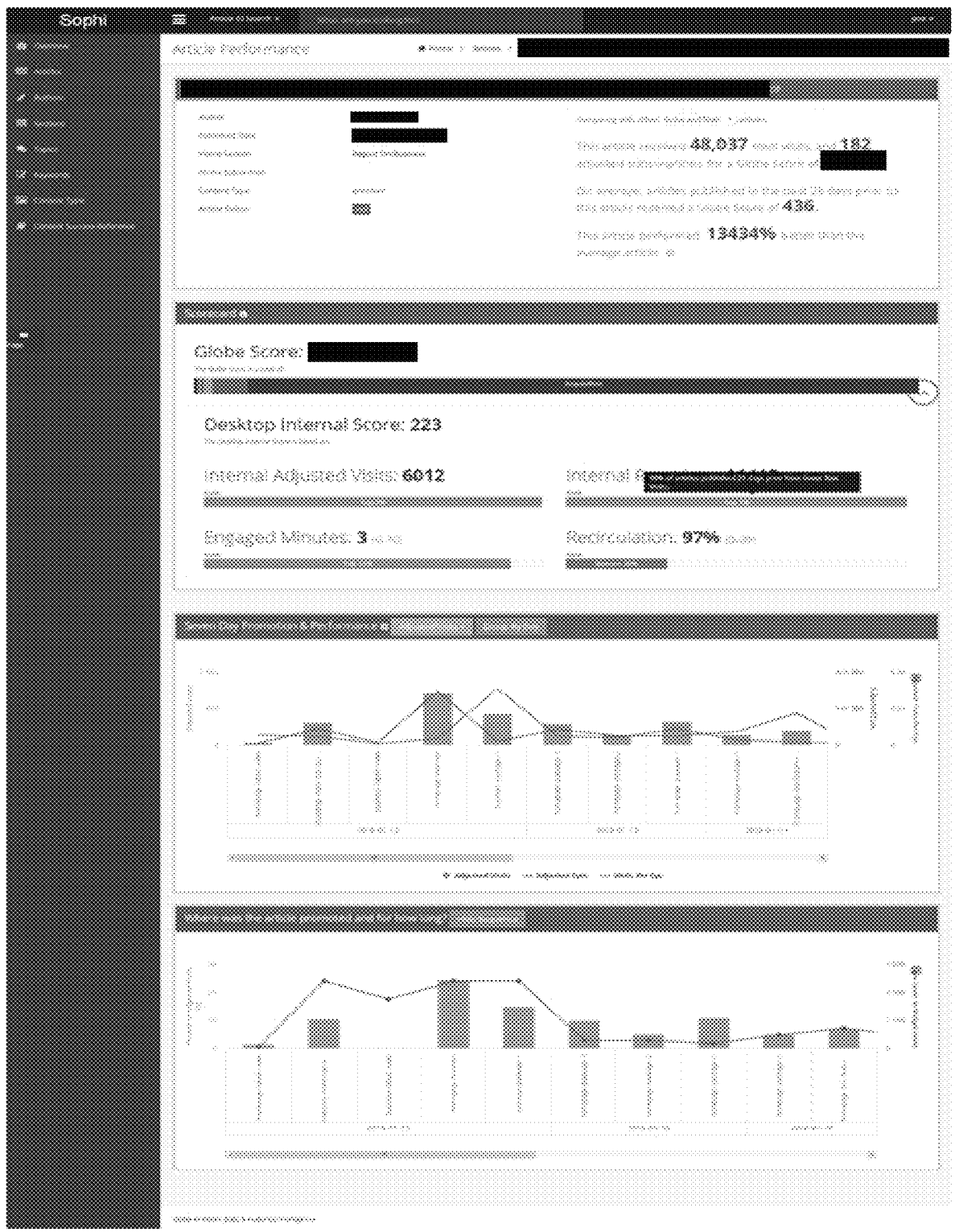

FIG. 11 shows an articles screen (or view) of the web application. Date and content filters may also be used to filter the results of the article screen. FIG. 12 is a detailed article screen (or view) showing the performance of an individual article. The detailed article screen can be invoked by select an individual article from the articles screen or other screen of the web application. The detailed article screen includes a first panel showing information about the article and comparison statistics to other articles, and a second panel showing the calculated performance indicators for the article. The detailed article screen also includes a third panel showing the seven day promotion and performance for the article, and a fourth panel showing where the article was promoted on the website (or possible application) and for how long.

Figure 13:
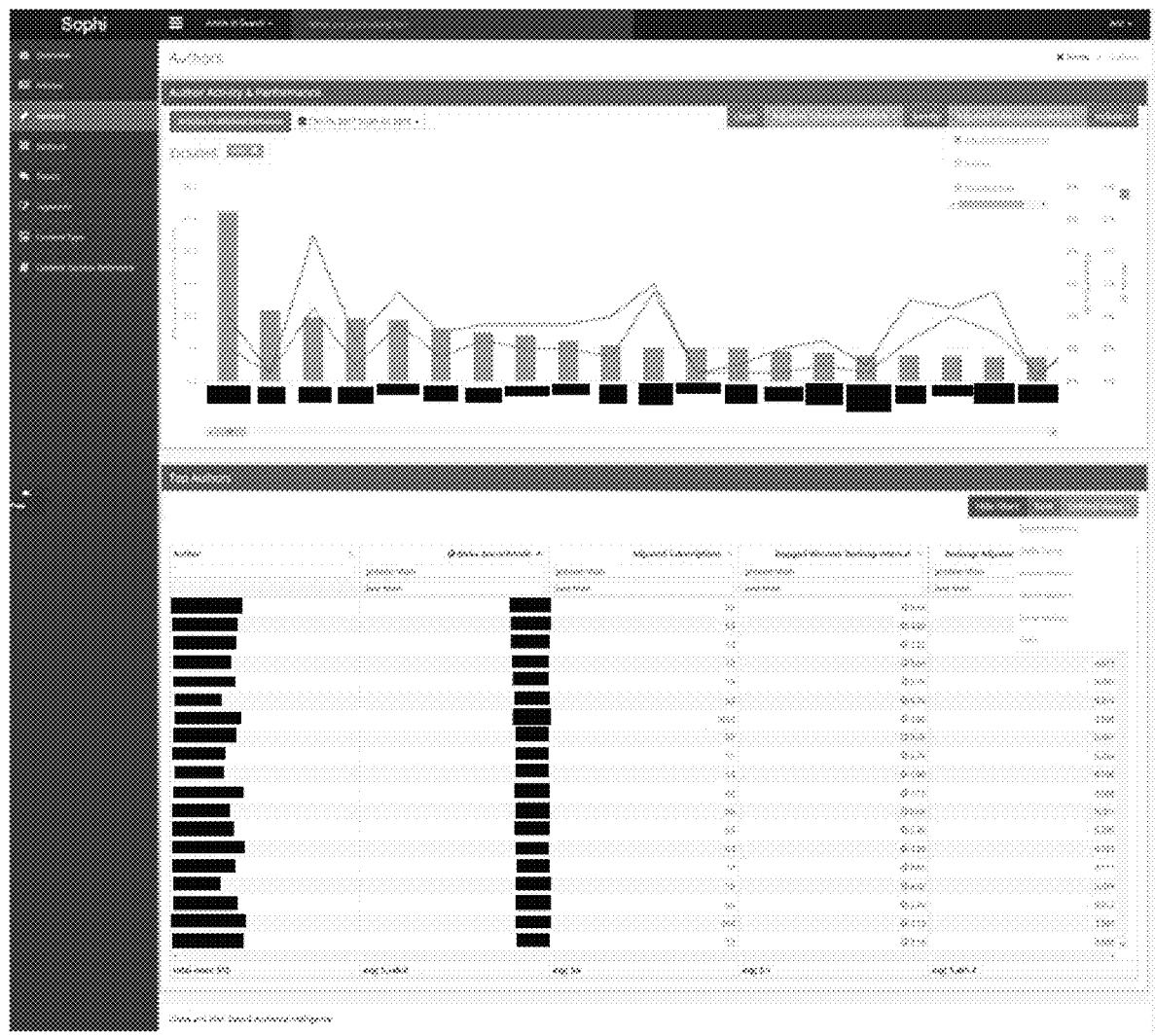

FIG. 13 shows an author screen (or view) of the web application. The author screen includes a first panel including an interactive graph showing author activity and performance, and a second panel showing the top authors. Date and content filters may also be used to filter the results of the article screen.

Figure 14:
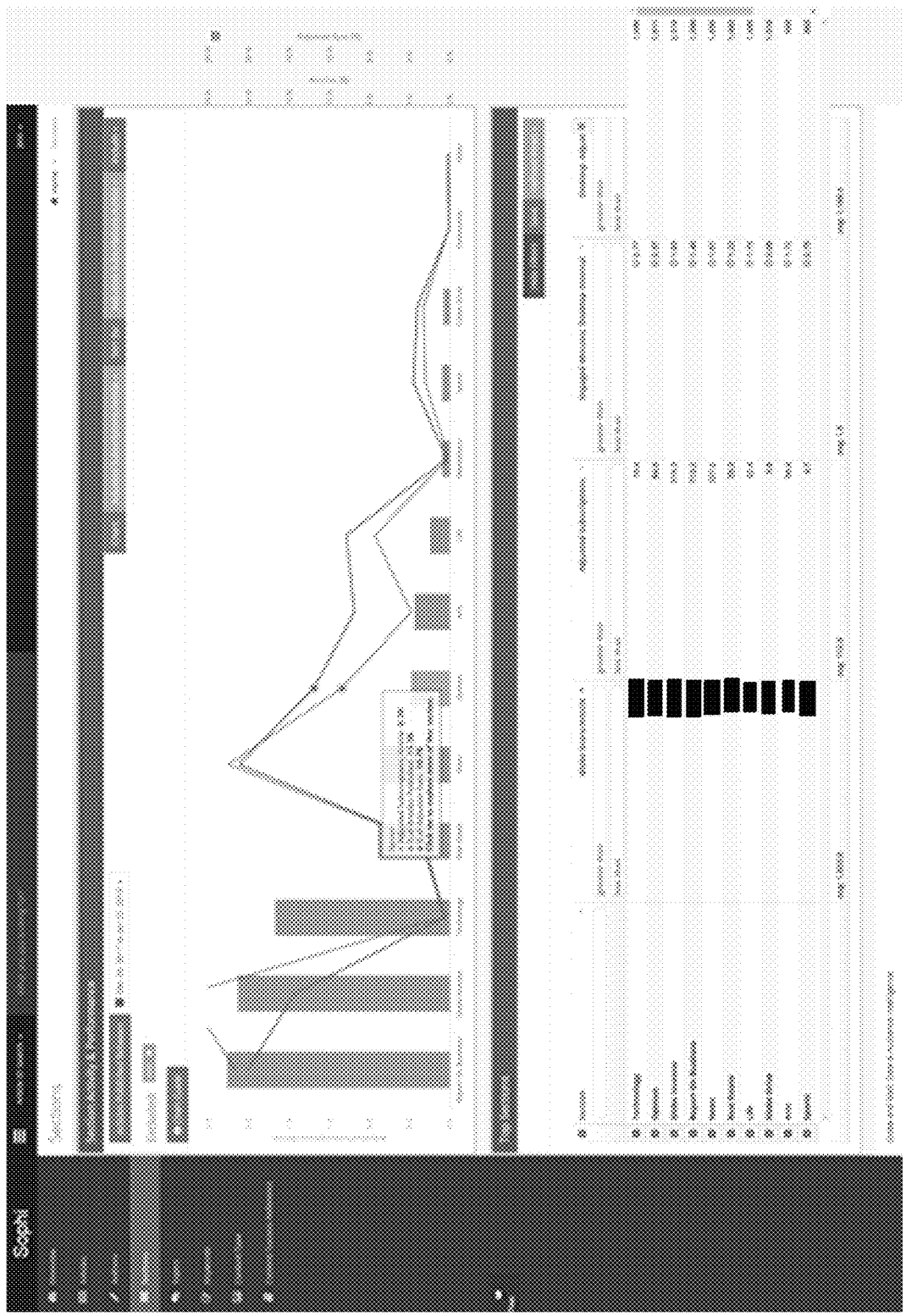

FIG. 14 is a sections screen (or view) showing the performance of an individual section. The sections screen includes a first panel including an interactive graph showing section activity and performance, and a second panel showing the top sections. Date and content filters may also be used to filter the results of the sections screen.

Figure 15:
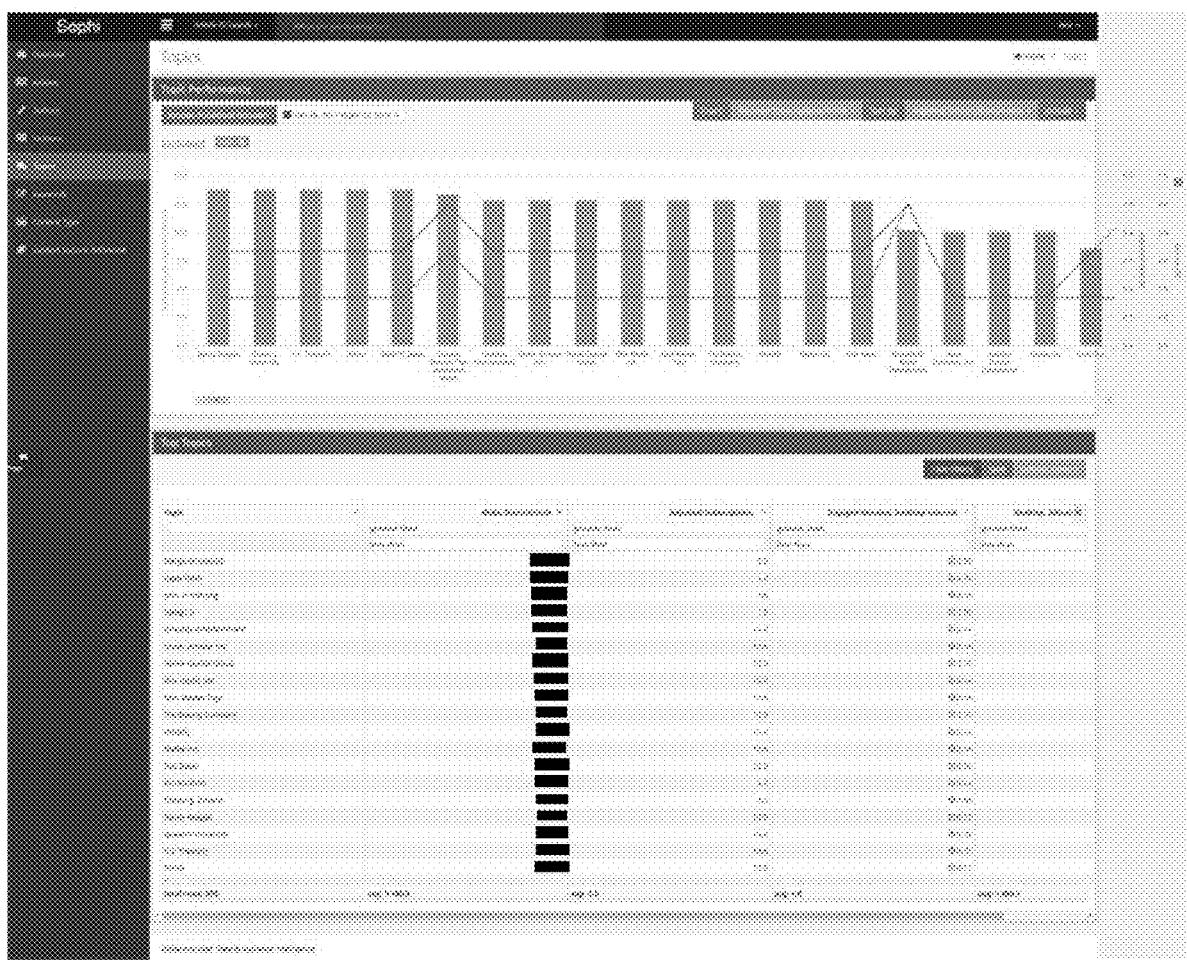

FIG. 15 is a topics screen (or view) showing the performance of an individual topics. The topics screen includes a first panel including an interactive graph showing topics activity and performance, and a second panel showing the top topics. Date and content filters may also be used to filter the results of the topics screen.

Figure 16:
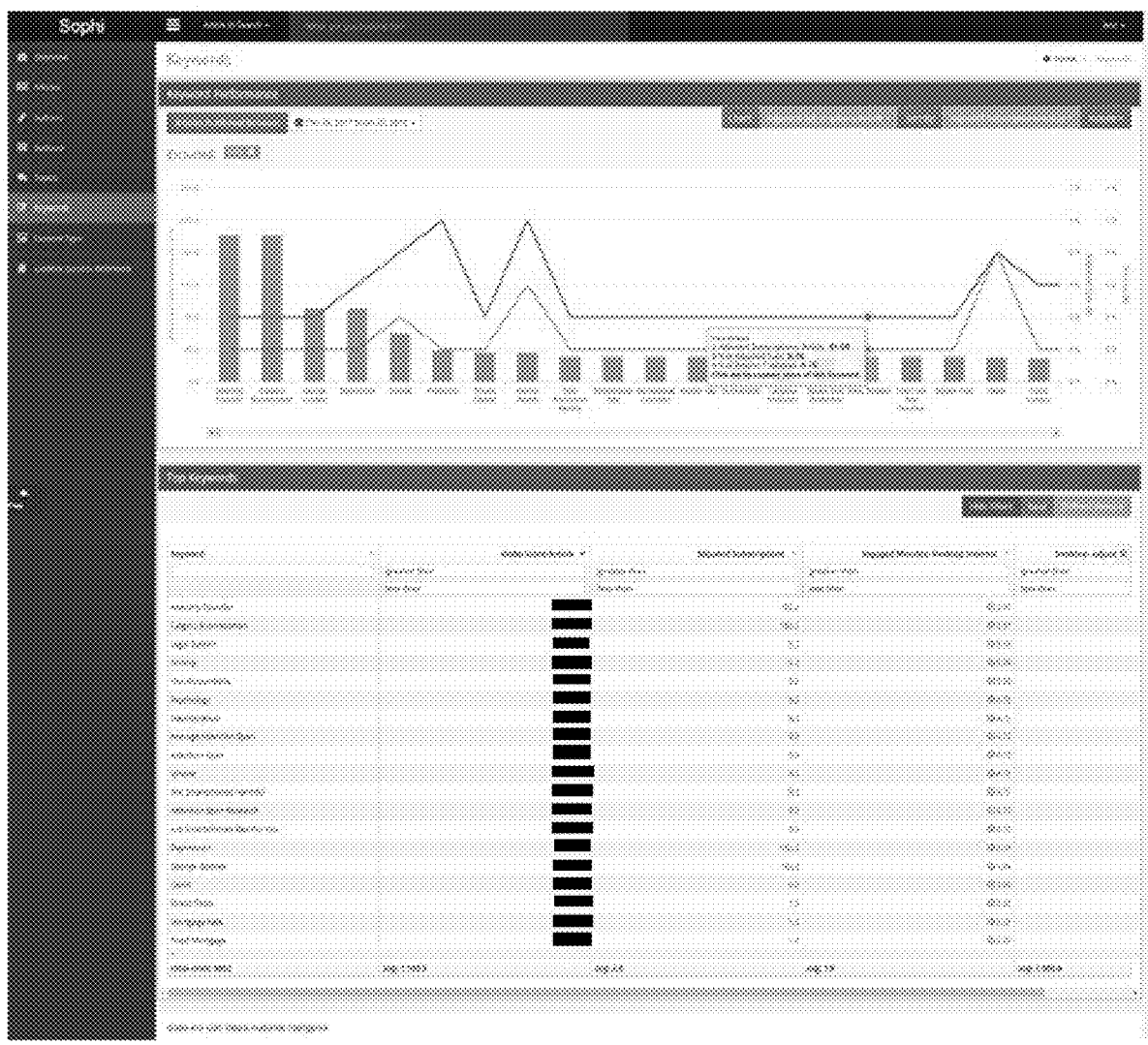

FIG. 16 is a keywords screen (or view) showing the performance of an individual keywords. The keywords screen includes a first panel including an interactive graph showing keyword activity and performance, and a second panel showing the top keywords. Date and content filters may also be used to filter the results of the keywords screen.

Figure 17:
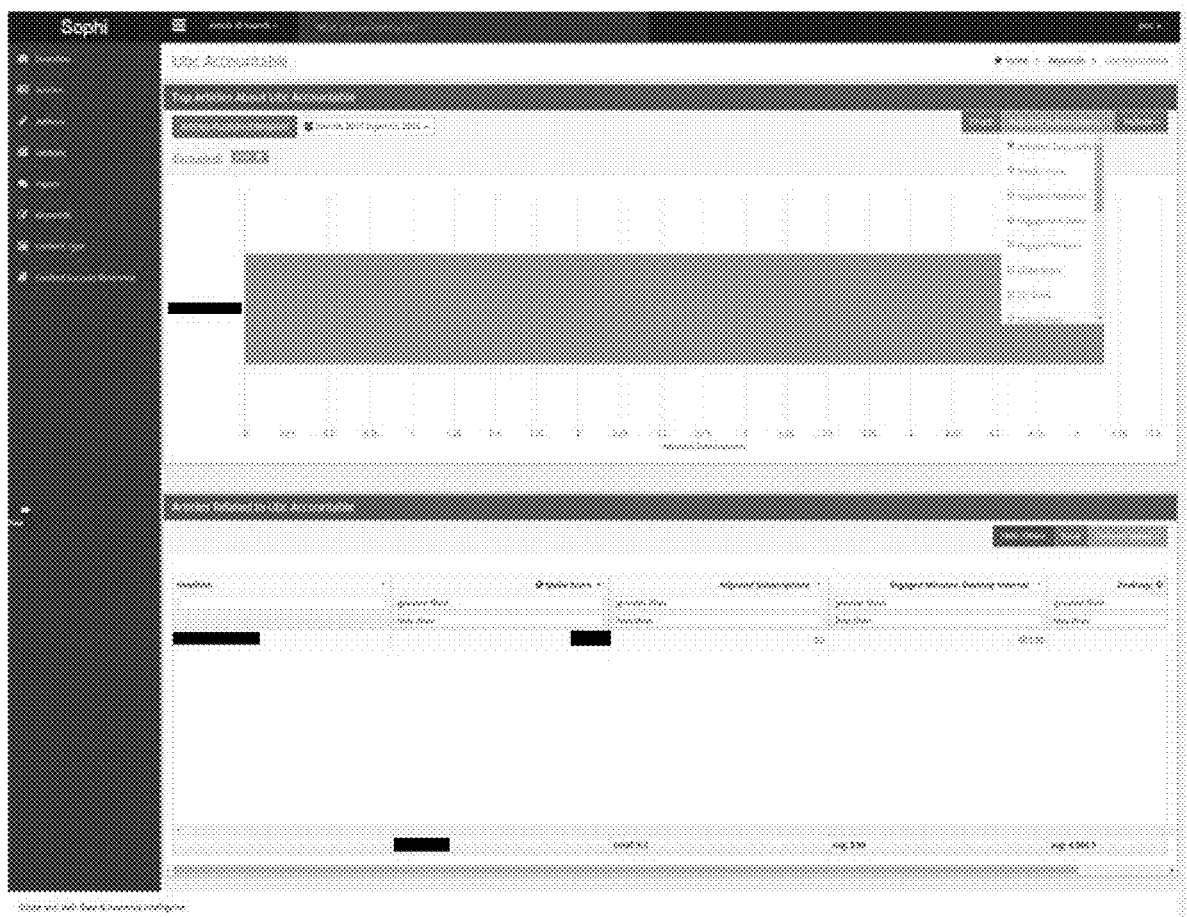

FIG. 17 is a detailed keyword screen (or view) showing the performance of an individual keyword. The detailed keyword screen can be invoked by select an individual keyword from the keywords screen or other screen of the web application. The detailed keyword screen includes a first panel showing information about the top articles about the keyword, and a second panel showing all articles about the keyword.

Figure 18:
Figure 19:
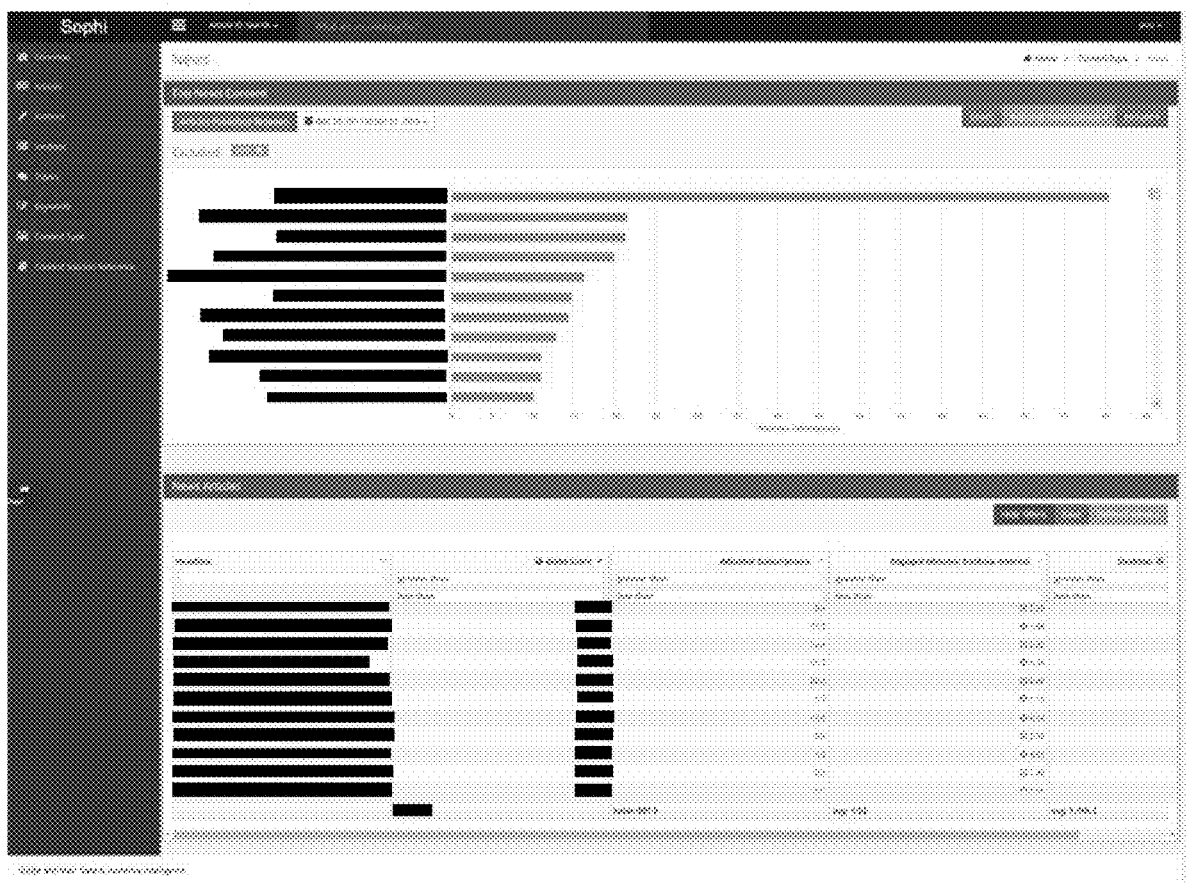

FIG. 18 is a content type screen (or view) showing the performance of an individual content types. The content type screen includes a first panel including an interactive graph showing content type activity and performance, and a second panel showing the top content types. Date and content filters may also be used to filter the results of the keywords screen. FIG. 19 is a detailed content type screen (or view) showing the performance of an individual content type. The detailed keyword screen can be invoked by select an individual content type from the content type screen or other screen of the web application. The detailed content type screen includes a first panel showing information about the top articles about the particular content type, and a second panel showing all content types of the particular content type.

Figure 20:
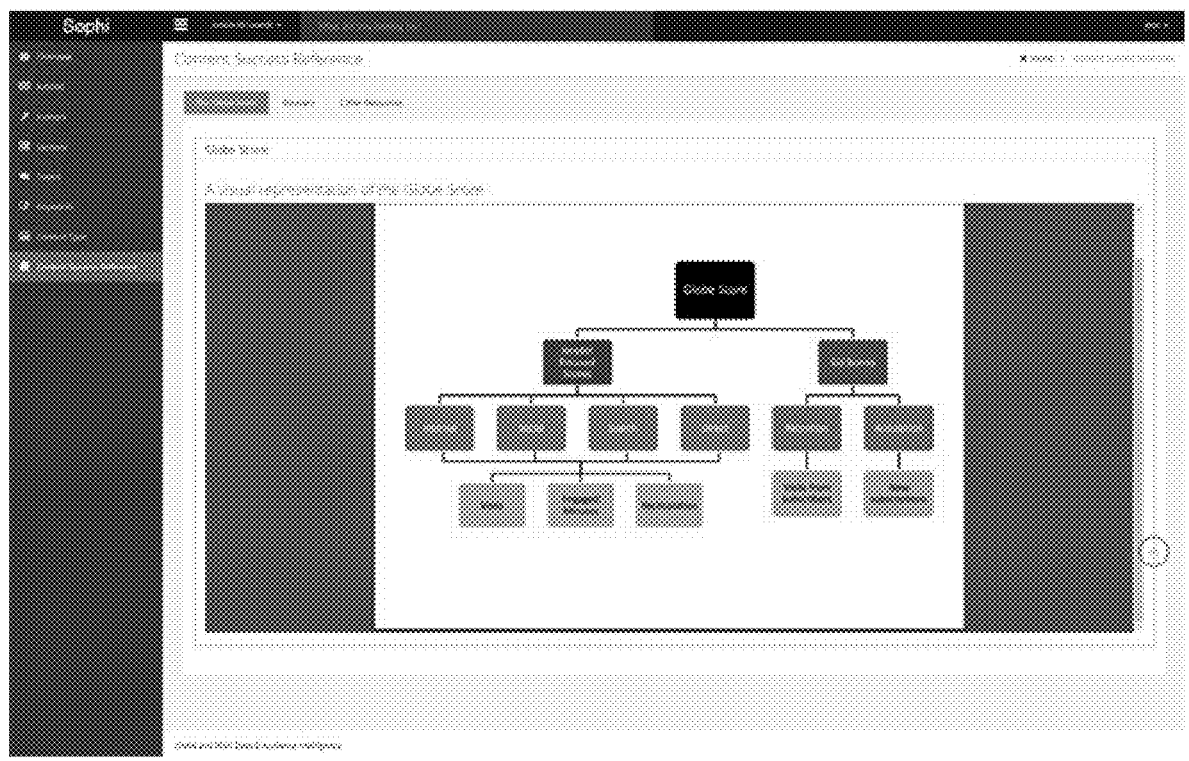

FIG. 20 is a content success reference screen (or view) having a diagram showing how the overall performance indicator is obtained along with its consistent elements.

Figure 21:
FIG. 21 is an example user interface screen of a web application provided by the data manager of the present disclosure in accordance with a second embodiment.

FIG. 21 is an example user interface screen of a web application provided by the data manager of the present disclosure in accordance with a second embodiment.

Figure 23:
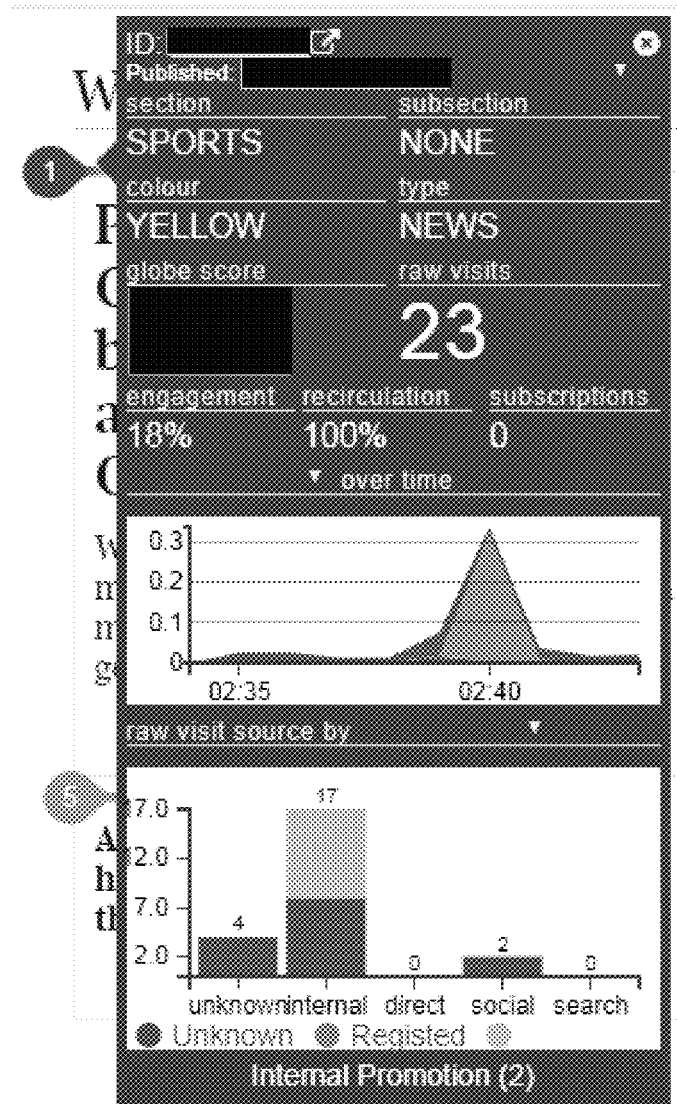

FIGS. 22 to 23 are example user interface screens of a head-up display (HUD) provided by the data manager of the present disclosure in accordance with an example embodiment. The HUD is a graphical layer that overlays source content. The source content may be a website (or webpage) or an application, among other possibilities. The HUD and the source content are managed by different controllers in at least some embodiments. The HUD may be a browser plugin in at least some embodiments that pulls data from the API module 404 and overlays the data or derived information on the website of the digital media platform displayed with a browser so that users can directly see which content items are performing well, live, in real-time. An example user interface screen of the HUD is shown in FIG. 22 in which the source content is the website of the digital media platform. Although the HUD in FIG. 22 overlays the website of the digital media platform, the HUD may be used to overlay a client application of the digital media platform in other embodiments, or other possibilities. In FIG. 22, the information displayed by the HUD comprises a number of graphical performance indicators or markers, one for each digital content item. The graphical performance indicators may be dynamic indicators that are updated in real-time so that users are provided with fresh data and analytics in real-time (e.g., continuously), or substantially real-time at short, regular intervals (e.g., every few seconds, minutes, etc.).

In FIG. 22, the graphical performance indicators include a content type indicator and a performance indicator for the respective digital content item. In other embodiments, the graphical performance indicators may be limited to one of the content type indicator or performance indicator. In yet other embodiments, other indicators may be included in the graphical performance indicators. In the shown embodiment, the performance indicator comprises a numerical performance indicator. The graphical performance indicators are configured to visually identify or indicate the digital content item to which the graphical performance indicator relates. In the shown example, the graphical performance indicators are pin-shaped, and include a pointer or tip that visually identifies the digital content item to which it relates. The nature and scope of the content type indicator varies based on the type of content. In the shown embodiment, the content type indicator of the graphical performance indicators indicates whether the digital content item is subscriber-only item 182, a free item 184 or a metered item (possibly whether a type 1 metered items 186 or type 2 metered items 188). The type of content indicated by the content type indicator may be provided or indicated by a color of the graphical performance indicator in some embodiments. The type of content indicated by the content type indicator may be provided or indicated by the shape or symbol which forms the graphical performance indicator rather than the color in other embodiments, among other possibilities. In yet other embodiments, the type of content may be omitted from the graphical performance indicator, as noted above.

The numerical performance indicator for the respective digital content item in the shown example is a ranking of the respective digital content item for all digital content items on the website based on the overall performance indicator. Alternatively, the ranking may be based on the first performance indicator, second performance indicator or other constituent of the overall performance indicator. The basis for the numerical performance indicator may be configurable. In other embodiments, a different performance indicator may be used such as the first performance indicator, second performance indicator or overall performance indicator for the respective digital content item.

FIG. 23 is a digital content item pop-up window that can be invoked using the HUD by selecting or hovering over a graphical performance indicator. The digital content item pop-up window includes detailed information about the respective digital content item such as the content ID, publication date, section, subsection, content type, access type (e.g., subscriber-only item 182, a free item 184 or a metered item; possibly whether a type 1 metered items 186 or type 2 metered items 188), engagement index, recirculation index, subscriber acquisition, raw visits, and promotion data. A different type of invokable menu or window other than a pop-up window may be provided in other embodiments.

Advantages

The performance indicator methodology of the present disclosure provides a more accurate measure of the number of accesses or attempts to access a digital content item by taking into account the amount of promotion each digital content item received when measuring the number of visits so that the number of accesses or attempts to access digital content items is normalized. In this way, the number of accesses or attempts to access (e.g., page visits or views) more accurately reflects a popularity of a digital content item among the userbase due to its content rather than the location of the digital content item on the website.

The performance indicator methodology of the present disclosure also measures the contribution of a digital content item on subscriber acquisition, retention and the overall userbase. Thus, the performance indicator methodology of the present disclosure provides a more holistic assessment of the performance of a digital content success and its overall enterprise value in the ecosystem of the digital media platform. This can be contrasted with traditional metrics that only consider page views or time spent with the drawback that it is difficult to determine whether a digital content item that has more page views has a greater enterprise value than a digital content item that has more engagement. This can also be contrasted with financial metrics such as revenue generated by advertisements, subscriptions, purchases of digital assets or the like. By combining a number of performance indicators which take into account one or a combination of promotional bias of at least some data sources, user visits (or interactions/views), user engagement, user recirculation, or user acquisition and retention (e.g., subscriber acquisition and retention) for one or more of the multiple data sources, the performance indicator methodology of the present disclosure simplifies the process of calculating a performance indicator for the digital content items and evaluating the digital content items in the ecosystem of the digital media platform.

The performance indicator methodology provides an improved methodology for determining an enterprise value of a digital content item by providing a new, holistic measure that captures various aspects of content success, e.g., traffic, engagement, recirculation, acquisition, and retention. Content is not judged by one criterion. Operators of a digital content platform may use the performance indicator methodology to make more data-driven decisions when planning and implementing a content strategy, i.e., operators are informed which content has a higher impact on users and is worth allocating more resources to. In the context of publishers, the enterprise value takes into account guiding editorial and business strategies.

Furthermore, using page views is limiting for digital content items behind a paywall since digital content items inherently receive fewer visits because users must subscribe to gain access to such digital content items. If digital content items behind a paywall are evaluated exclusively by the number of interactions (e.g., page views) or attempted interactions, subscriber-only items would perform poorly. The performance indicator methodology of the present disclosure, and in particular the overall performance indicator, addresses this issue by measuring an enterprise value of subscriber-only items and providing an attribution model to measure a content item's contribution to subscriber acquisition and retention.

Lastly, a number of studies performed by the Applicant on the performance indicator methodology of the present disclosure have confirmed that the performance indicator methodology has a high degree of correctness and robustness when compared with the revenue brought in by advertising and subscriptions as a proxy for correctness.

General

The coding of software for carrying out the above-described methods described is within the scope of a person of ordinary skill in the art having regard to the present disclosure. Machine readable code executable by one or more processors of one or more respective devices to perform the above-described method may be stored in a machine readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program. The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a data manager) to execute examples of the methods disclosed herein.

The term "processor" may comprise any programmable system comprising systems using micro- or nano-processors/controllers, reduced instruction set circuits (RISC), application specific integrated circuits (ASICs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A multi-source web traffic analytics system, comprising:
    an internet traffic analysis server configured for providing traffic data for a digital media platform having a plurality of digital content items;
    one or more crawler servers configured for providing crawl logs of the digital media platform, wherein the one or more crawler servers comprise one or more of a web crawler server and an application crawler server;

a Web server comprising:
a communication system; and
a processor coupled to the communication system and configured to:
(a) obtain crawl data collected by the one or more crawler servers and traffic data collected by the internet traffic analysis server via the communication system, wherein the crawl data comprises a copy of each digital content item or copy of a page representing each digital content item, and wherein the traffic data comprises a number of interactions with each digital content item in the plurality of digital content items of the digital media platform;
(b) store the crawl data in a first database and store traffic data in a second database;
(c) determine via an application programing interface (API), from the crawl data in the first database and the traffic data in the second database, an amount of promotion for each digital content item in the plurality of digital content items of the digital media platform presented to a user viewport during an evaluation period, wherein the amount of promotion for each digital content item is determined by:
determining via the API, from the crawl data and the traffic data, a number of exposures of a promotion for a respective digital content item during the evaluation period;
determining via the API, from the crawl data and the traffic data, an average number of exposures for a digital content item during the evaluation period; and
determining via the API a promotion ratio for the respective digital content item based on the number of exposures of the promotion for the respective digital content item during the evaluation period and the average number of exposures for a digital content item during the evaluation period;
(d) determine via the API, from the traffic data in the second database for the evaluation period, an adjusted number of interactions with each digital content item based on the number of interactions with each digital content item and the promotion ratio;
(e) determine, from the traffic data in the second database for the evaluation period, a user performance indicator for each digital content item based on the adjusted number of interactions, an engagement index measuring an amount of time spent by users interacting with each digital content item relative to an average time spent by users interacting with a digital content item, and a recirculation index measuring an amount of interaction with additional digital content items attributable to each digital content item;
(f) determine, from the traffic data in the second database for the evaluation period, a subscriber performance indicator for each digital content item based on an acquisition performance indicator measuring an amount of new subscribers during the evaluation period attributable to each digital content item based on the adjusted number of interactions and a number of new subscribers generated in response to a paywall presented before allowing interaction with the digital content item, and a retention performance indicator for each digital content item measuring an amount of existing subscribers retained during the evaluation period attributable to each digital content item based on the adjusted number of interactions and an average number of interactions for all digital content items in the plurality of the digital content items for promotion of the digital content items;
(g) determine an overall performance indicator for each digital content item based on the user performance indicator and the subscriber performance indicator for the digital content item with configurable weights associated with each of the user performance indicator and the subscriber performance indicator;
(h) cause an interactive portal to be displayed on a display of a client device in communication with the Web server via the communication system, the interactive portal providing a real-time analysis of the digital media platform, the interactive portal configured to provide a number of interactive graphical user interface screens that are displayable, each interactive graphical user interface screen displaying real-time performance information for one or more digital content items based on one or more performance indicators selected from the user performance indicator for each digital content item, the subscriber performance indicator for each digital content item and the overall performance indicator for each digital content item, the interactive portal configured to filter and compare digital content items based on the one or more performance indicators and one or more parameters;
(i) repeat operations (a) to (g) at a regular interval to generate updated values for the user performance indicator, the subscriber performance indicator and the overall performance indicator for each digital content item; and
(j) cause the interactive portal displayed on the display of the client device to be updated in real-time with the updated values for the user performance indicator, the subscriber performance indicator and the overall performance indicator for each digital content item.

2. The multi-source web traffic analytics system of claim 1, further comprising:
a media crawler server in communication with the Web server configured for providing crawl logs of a distinct third party digital media platform.

3. The multi-source web traffic analytics system of claim 2, wherein the digital media platform is a social media digital platform.

4. The multi-source web traffic analytics system of claim 3, wherein the media crawler server provides a social media crawler that crawls one or more social media pages of the digital media platform to provide social media crawl logs of the social media pages of the digital media platform on the social media digital platform.

5. The multi-source web traffic analytics system of claim 1, wherein the processor is configured to determine the user performance indicator based on a plurality of individual performance indicators, each individual performance indicator being associated with a particular traffic type in a plurality of traffic types, each individual performance indicator being determined from the traffic data in the second database for the evaluation period, wherein the traffic types comprise internal traffic directed from the digital media platform, search traffic directed from a search engine, social media traffic directed from a social media network and other traffic, wherein the internal traffic comprises web traffic associated with a website of the digital media platform and/or application traffic associated with client applications of the digital media platform operating on client devices.

6. The multi-source web traffic analytics system of claim 1, wherein the number of exposures of the promotion for the digital content item is determined by:

determining, based on the crawl data, a depth of the promotion for the digital content item with respect to a height of the page on which the digital content item was promoted;

determining, based on the crawl data, a size of the promotion for the digital content item;

determining, based on the traffic data, an average scroll depth for the digital content item during the period of promotion;

determining, based on the traffic data, a number of views of the page on which the digital content item was promoted during the period of promotion; and determining the number of exposures of the promotion for the digital content item based on the depth of the promotion for the digital content item with respect to the height of the page on which the digital content item was promoted, the size of the promotion for the digital content item, the average scroll depth for the digital content item during the period of promotion, and number of views of the page on which the digital content item was promoted during the period of promotion.

7. The multi-source web traffic analytics system of claim 1, wherein the regular interval is between 2 and 5 minutes.

8. A Web server, comprising:
a communication system; and
a processor coupled to the communication system and configured to:
(a) obtain crawl data by one or more crawler servers and traffic data collected by an internet traffic analysis server via the communication system, wherein the crawl data comprises a copy of each digital content item or copy of a page representing each digital content item, and wherein the traffic data comprises a number of interactions with each digital content item in the plurality of digital content items of the digital media platform, wherein the one or more crawler servers comprise one or more of a web crawler server and an application crawler server;
(b) store the crawl data in a first database and store traffic data in a second database;
(c) determine via an application programing interface (API), from the crawl data in the first database and the traffic data in the second database, an amount of promotion for each digital content item in the plurality of digital content items of the digital media platform presented to a user viewport during an evaluation period, wherein the amount of promotion for each digital content item is determined by:
determining via the API, from the crawl data and the traffic data, a number of exposures of a promotion for a respective digital content item during the evaluation period;
determining via the API, from the crawl data and the traffic data, an average number of exposures for a digital content item during the evaluation period; and
determining via the API a promotion ratio for the respective digital content item based on the number of exposures of the promotion for the respective digital content item during the evaluation period and the average number of exposures for a digital content item during the evaluation period;
(d) determine via the API, from the traffic data in the second database for the evaluation period, an adjusted number of interactions with each digital content item based on the number of interactions with each digital content item and the promotion ratio;
(e) determine, from the traffic data in the second database for the evaluation period, a user performance indicator for each digital content item based on the adjusted number of interactions, an engagement index measuring an amount of time spent by users interacting with each digital content item relative to an average time spent by users interacting with a digital content item, and a recirculation index measuring an amount of interaction with additional digital content items attributable to each digital content item;
(f) determine, from the traffic data in the second database for the evaluation period, a subscriber performance indicator for each digital content item based on an acquisition performance indicator measuring an amount of new subscribers during the evaluation period attributable to each digital content item based on the adjusted number of interactions and a number of new subscribers generated in response to a paywall presented before allowing interaction with the digital content item, and a retention performance indicator for each digital content item measuring an amount of existing subscribers retained during the evaluation period attributable to each digital content item based on the adjusted number of interactions and an average number of interactions for all digital content items in the plurality of the digital content items for promotion of the digital content items;
(g) determine an overall performance indicator for each digital content item based on the user performance indicator and the subscriber performance indicator for the digital content item with configurable weights associated with each of the user performance indicator and the subscriber performance indicator;
(h) cause an interactive portal to be displayed on a display of a client device in communication with the Web server via the communication system, the interactive portal configured to provide a number of interactive graphical user interface screens comprising interactive user interface screens that are displayable, each interactive graphical user interface screen displaying real-time performance information for one or more digital content items based on one or more performance indicators selected from the user performance indicator for each digital content item, the subscriber performance indicator for each digital content item and the overall performance indicator for each digital content item, the interactive portal configured to filter and compare digital content items based on the one or more performance indicators and one or more parameters;
(i) repeat operations (a) to (g) at a regular interval to generate updated values for the user performance indicator, the subscriber performance indicator and the overall performance indicator for each digital content item; and
(j) cause the interactive portal displayed on the display of the client device to be updated in real-time with the updated values for the user performance indicator, the subscriber performance indicator and the overall performance indicator for each digital content item.

9. The Web server of claim 8, wherein the engagement index is determined in accordance with the following equation:

$$\text{Engagement Index} = \frac{\text{Time Spent}}{\text{Average Time Spent}}$$

wherein Time Spent represents an average time spent by users interacting with the digital content item, Average Time Spent represents an average time spent by users interacting with a digital content item averaged over all digital content items in the plurality of digital content items, wherein a configurable upper and lower limit is applied to the engagement index to avoid extreme values;

wherein the recirculation index is determined in accordance with the following equation, wherein a configurable upper and lower limit is applied to the recirculation index to avoid extreme values:

$$\text{Recirculation Index} = \frac{\text{Recirculation}}{\text{Average Recirculation}}$$

wherein Recirculation has a value defined as $$\text{Recirculation} = 1 - \frac{\text{bouncers}}{\text{visitors}}$$

wherein bouncers represents a number of users that did not interact with additional digital content items after interacting with the digital content item, and visitors represents a number of individual user interactions with the digital content item.

10. The Web server of claim 8, wherein the user performance indicator is determined according to the following equation:

User PI=Internal PI+Search PI+Social PI+Direct PI wherein User PI is the user performance indicator, Internal PI is a performance indicator for internal traffic directed from a page of the digital media platform, Search PI is a performance indicator for search traffic directed from a search engine, Social PI is a performance indicator for social traffic directed from a social network, and Direct PI is a performance indicator for other traffic.

11. The Web server of claim 10, wherein Internal PI is determined according to the following equation:

Internal PI=Adjusted Interactions×Engagement Index×Recirculation Index×Value wherein Adjusted Interactions is the number of interactions from internal traffic adjusted for the determined amount of promotion of the digital content item and is determined in accordance with the following equation:

Adjusted Interactions=Total Interactions/Promotion Ratio wherein Total Interactons is a number of interactions with the digital content item during the evaluation period and Promotion Ratio is determined according to the following equation:

Promotion Ratio=Number of Exposures/Average Number of Exposures wherein Number of Exposures is an estimate of a number of exposures of a promotion for the digital content item determined during a period of promotion and Average Number of Exposures is an estimate of a number of exposures of an average digital content item promoted on the same page during the same period of promotion, wherein a configurable upper and lower limit is applied to the Number of Exposures to avoid extreme values; and wherein Value is an enterprise value of user interaction.

12. The Web server claim 11, wherein the estimation of the number of exposures of the promotion for the digital content item is determined based on a depth of the promotion for the digital content item with respect to a height of the page on which the digital content item was promoted, a size of the promotion for the digital content item, a number of views of the page on which the digital content item was promoted during the period of promotion, and an average scroll depth during the period of promotion.

13. The Web server of claim 11, wherein Search PI, Social PI and Direct PI are determined according to the following equations:

Search PI=Interactions$_{search}$×Engagement Index$_{search}$×Recirculation Index$_{search}$×Value Social PI=Interactions$_{social}$×Engagement Index$_{social}$× Recirculation Index$_{social}$×Value Direct PI=Interactions$_{direct}$×Engagement Index$_{direct}$× Recirculation Index$_{direct}$×Value wherein Interactions$_{search}$, Interactions$_{social}$ and Interactions$_{direct}$ are the number of interactions for search traffic, social media traffic and other traffic, respectively;

wherein Engagement Index$_{search}$, Engagement Index$_{social}$ and Engagement Index$_{direct}$ are the engagement indexes for search traffic, social media traffic and other traffic, respectively;

wherein Recirculation Index$_{search}$, Recirculation Index$_{social}$ and Recirculation Index$_{direct}$ are the recirculation indexes for search traffic, social media traffic and other traffic, respectively.

14. The Web server of claim 8, wherein the subscriber performance indicator is determined according to the following equation:

Subscriber PI=Acquistion PI+Retention PI wherein Subscriber PI is the subscriber performance indicator, Acquistion PI is a measure of a contribution of the digital content item to generating a new subscription, and Retention PI is a measure of a contribution of the digital content item to retaining existing subscription.

15. The Web server of claim 14, wherein Acquisition PI is determined according to the following equation:

Acquisition PI=Adjusted Subscriptions×Subscription Value wherein Adjusted Subscription PI is a measure of the contribution of the digital content item to generating a new subscription, and Subscription Value is an enterprise value of a new subscription;

wherein Adjusted Subscriptions is determined according to the following equation:

Adjusted Subscriptions=Total Subscriptions/Promotion Ratio wherein Total Subscriptions is a total of a number of full subscription credits and partial subscription credits, wherein a full subscription credit is allotted for a digital content item responsive to a new subscription is generated in response to presenting the new subscriber with a paywall, and a partial subscription credit is allotted for digital content item in the new subscriber's history responsive to a new subscription is not generated in response to presenting the new subscriber with the paywall, wherein the partial subscription credit is determined according to the following equation:

$$\text{Partial Subscription credit} = \frac{\text{Full Subscription Credit}}{\substack{\text{Number of digital content items} \\ \text{in new subscriber's history} \\ \text{prior to subscription}}}$$

wherein Promotion Ratio is determined according to the following equation, wherein a configurable upper and lower limit is applied to the Promotion Ratio to avoid extreme values:

Promotion Ratio=Number of Exposures/Average Number of Exposures wherein Number of Exposures is an estimate of a number of exposures of a promotion for the digital content item determined during a period of promotion, and Average Number of Exposures is an estimate of a number of exposures of an average digital content item promoted on the same page during the same period of promotion.

16. The Web server of claim 14, wherein Retention PI is determined according to the following equation:

$$\text{Retention } PI = \frac{\text{Retention Index} \times \text{Number of Subscribers} \times \text{Subscriber Value}}{\text{Number of Digital Content Items}}$$

wherein Number of Subscribers is a number of subscribers during the evaluation period, Number of Digital Content items is a number of digital content items available on the digital media platform during the evaluation period, Subscription Value is an enterprise value of an existing subscription, Retention Index is determined according to the following equation:

$$\text{Retention Index} = \frac{\text{Adjusted Interactions}_{subscribers}}{\text{Average Adjusted Interactions}_{subscribers}}$$

wherein Adjusted Interactions$_{subscribers}$ is an adjusted number of subscriber interactions with the digital content item during the evaluation period adjusted for promotion, and Average Adjusted Interactions$_{subscribers}$ is an average adjusted number of subscriber interactions averaged over all digital content on the digital media platform during the evaluation period adjusted for promotion.

17. The Web server of claim 8, wherein the digital media platform comprises a website and an application platform supporting client applications operating on client devices.

18. The Web server of claim 8, wherein the traffic data comprises clickstream data.

19. The Web server of claim 8, wherein the digital content item comprises one or more of an article, audio, video, streamed audio, streamed video, virtual reality data, or augmented reality data.

20. A method of performing multi-source web traffic analytics for a digital media platform comprising a plurality of digital content items, the method performed by a Web server comprising a communication system and a processor coupled to the communication system, the method comprising:

(a) obtaining crawl data by one or more crawler servers and traffic data collected by an internet traffic analysis server via the communication system, wherein the crawl data comprises a copy of each digital content item or copy of a pace representing each digital content item, and wherein the traffic data comprises a number of interactions with each digital content item in the plurality of digital content items of the digital media platform, wherein the one or more crawler servers comprise one or more of a web crawler server and an application crawler server;

(b) storing the crawl data in a first database based and storing traffic data in a second database;

(c) determining via an application programing interface (API), from the crawl data in the first database and the traffic data in the second database, an amount of promotion for each digital content item in the plurality of digital content items of the digital media platform presented to a user viewport during an evaluation period, wherein the amount of promotion for each digital content item is determined by:
 determining via the API, from the crawl data and the traffic data, a number of exposures of a promotion for a respective digital content item during the evaluation period;
 determining, from the crawl data and the traffic data, an average number of exposures for a digital content item during the evaluation period; and
 determining via the API a promotion ratio for the respective digital content item based on the number of exposures of the promotion for the respective digital content item during the evaluation period and the average number of exposures for a digital content item during the evaluation period;

(d) determining via the API, from the traffic data in the second database for the evaluation period, an adjusted number of interactions with each digital content item based on the number of interactions with each digital content item and the promotion ratio;

(e) determining, from the traffic data in the second database for the evaluation period, a user performance indicator for each digital content item based on the adjusted number of interactions, an engagement index measuring an amount of time spent by users interacting with each digital content item relative to an average time spent by users interacting with a digital content item, and a recirculation index measuring an amount of interaction with additional digital content items attributable to each digital content item;

(f) determining, from the traffic data in the second database for the evaluation period, a subscriber performance indicator for each digital content item based on an acquisition performance indicator measuring an amount of new subscribers during the evaluation period attributable to each digital content item based on the adjusted number of interactions and a number of new subscribers generated in response to a paywall presented before allowing interaction with the digital content item, and a retention performance indicator for each digital content item measuring an amount of existing subscribers retained during the evaluation period attributable to each digital content item based on the adjusted number of interactions and an average number of interactions for all digital content items in the plurality of the digital content items for promotion of the digital content items;
(g) determining an overall performance indicator for each digital content item based on the user performance indicator and the subscriber performance indicator for the digital content item with configurable weights associated with each of the user performance indicator and the subscriber performance indicator;
(h) causing an interactive portal to be displayed on a display of a client device in communication with the Web server via the communication system, the interactive portal providing a real-time analysis of the digital media platform, the interactive portal configured to provide a number of interactive graphical user interface screens that are displayable, each interactive graphical user interface screen displaying real-time performance information for one or more digital content items based on one or more performance indicators selected from the user performance indicator for each digital content item, the subscriber performance indicator for each digital content item and the overall performance indicator for each digital content item, the interactive portal configured to filter and compare digital content items based on the one or more performance indicators and one or more parameters;
(i) repeating operations (a) to (g) at a regular interval to generate updated values for the user performance indicator, the subscriber performance indicator and the overall performance indicator for each digital content item; and
(j) causing the interactive portal displayed on the display of the client device to be updated in real-time with the updated values for the user performance indicator, the subscriber performance indicator and the overall performance indicator for each digital content item.

21. A method of performing multi-source web traffic analytics for a digital media platform comprising a plurality of digital content items, the method performed by a Web server comprising a communication system and a processor coupled to the communication system, the method comprising:

obtaining crawl data comprising a copy of each digital content item or copy of a page representing each digital content item;

obtaining traffic data comprising a number of interactions with each digital content item in the plurality of digital content items of the digital media platform;

storing the crawl data and traffic data;

determining via an application programing interface (API), from the crawl data and traffic data, an amount of promotion for each digital content item in the plurality of digital content items of the digital media platform presented to a user viewport during an evaluation period by:
  determining via the API, from the crawl data and the traffic data, a number of exposures of a promotion for the digital content item during a period of promotion;
  determining via the API, from the crawl data and the traffic data, an average number of exposures during the period of promotion; and
  determining via the API, a promotion ratio based on the number of exposures of the promotion for the digital content item during the period of promotion and the average number of exposures during the period of promotion;

determining via the API, from the traffic data for the evaluation period, an adjusted number of interactions with each digital content item based on the number of interactions with each digital content item and the promotion ratio; and updating the digital media platform based on the adjusted number of interactions with each digital content item.

* * * * *

UNITED STATES PATENT AND TRADEMARK OFFICE
CERTIFICATE OF CORRECTION

PATENT NO. : 11,328,026 B2
APPLICATION NO. : 16/007574
DATED : May 10, 2022
INVENTOR(S) : Jennifer Nguyen et al.

It is certified that error appears in the above-identified patent and that said Letters Patent is hereby corrected as shown below:

On the Title Page

Please correct item (73) the spelling of the Assignee:
The Globe and Mall Inc.
To:
The Globe and Mail Inc., Signed and Sealed this
Eighteenth Day of October, 2022

Katherine Kelly Vidal
*Director of the United States Patent and Trademark Office*